United States Patent
Pasko

(10) Patent No.: US 12,159,086 B2
(45) Date of Patent: *Dec. 3, 2024

(54) DEVICE ARBITRATION BY MULTIPLE SPEECH PROCESSING SYSTEMS

(71) Applicant: Amazon Technologies, Inc., Seattle, WA (US)

(72) Inventor: Stanislaw Ignacy Pasko, Zawonia (PL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,242

(22) Filed: Nov. 23, 2022

(65) Prior Publication Data

US 2023/0297327 A1   Sep. 21, 2023

Related U.S. Application Data

(63) Continuation of application No. 16/895,869, filed on Jun. 8, 2020, now Pat. No. 11,513,766, which is a
(Continued)

(51) Int. Cl.
*G10L 15/30*     (2013.01)
*G06F 3/16*      (2006.01)
(Continued)

(52) U.S. Cl.
CPC .............. *G06F 3/167* (2013.01); *G10L 15/22* (2013.01); *G10L 15/32* (2013.01); *G10L 25/60* (2013.01); *G10L 2015/088* (2013.01)

(58) Field of Classification Search
CPC .......... G10L 15/30; G10L 15/32; G06F 3/167
See application file for complete search history.

(56) References Cited

U.S. PATENT DOCUMENTS

| 9,213,659 B2 | 12/2015 | Beaumont et al. |
| 9,715,878 B2 | 7/2017 | Sims, III |

(Continued)

FOREIGN PATENT DOCUMENTS

WO    WO2017213681    12/2017

OTHER PUBLICATIONS

PCT Invitation to Pay Fees did Jul. 22, 2019 for PCT Application No. PCT/US2019/026639, "Device Arbitration By Multiple Speech Processing Systems", 13 pages.
(Continued)

*Primary Examiner* — Daniel Abebe
(74) *Attorney, Agent, or Firm* — Lee & Hayes, P.C.

(57) ABSTRACT

A device can perform device arbitration, even when the device is unable to communicate with a remote system over a wide area network (e.g., the Internet). Upon detecting a wakeword in an utterance, the device can wait a period of time for data to arrive at the device, which, if received, indicates to the device that another speech interface device in the environment detected an utterance. If the device receives data prior to the period of time lapsing, the device can determine the earliest-occurring wakeword based on multiple wakeword occurrence times, and may designate whichever device that detected the wakeword first as the designated device to perform an action with respect to the user speech. To account for differences in sound capture latency between speech interface devices, a pre-calculated time offset value can be applied to wakeword occurrence time(s) during device arbitration.

20 Claims, 10 Drawing Sheets

Related U.S. Application Data continuation of application No. 15/948,519, filed on Apr. 9, 2018, now Pat. No. 10,679,629.

(51) Int. Cl.
  *G10L 15/22* (2006.01)
  *G10L 15/32* (2013.01)
  *G10L 25/60* (2013.01)
  *G10L 15/08* (2006.01)

(56) References Cited

U.S. PATENT DOCUMENTS

| | | |
|---|---|---|
| 10,089,072 B2 | 10/2018 | Piersol et al. |
| 2015/0230075 A1 | 8/2015 | Reunamaki et al. |
| 2016/0155443 A1 | 6/2016 | Khan et al. |
| 2017/0076720 A1 | 3/2017 | Gopalan et al. |
| 2017/0083285 A1 | 3/2017 | Meyers et al. |
| 2017/0090864 A1* | 3/2017 | Jorgovanovic .......... G10L 15/22 |
| 2017/0249940 A1* | 8/2017 | Chen ...................... G10L 15/32 |
| 2017/0357478 A1 | 12/2017 | Piersol et al. |
| 2019/0074027 A1* | 3/2019 | Bar-or .................... G10L 25/48 |
| 2019/0311720 A1 | 10/2019 | Pasko |
| 2020/0301661 A1 | 9/2020 | Pasko |

OTHER PUBLICATIONS

Non Final Office Action dated Oct. 2, 2019 for U.S. Appl. No. 15/948,519 "Device Arbitration By Multiple Speech Processing Systems" Pasko, 8 pages.

Office Action for U.S. Appl. No. 16/895,869, mailed Mar. 10, 2022, Pasko, "Device Arbitration By Multiple Speech Processing Systems", 9 pages.

PCT Search Report and Written OPinion mailed on Sep. 12, 2019, for PCT Application No. PCT/US2019/026639, 17 pages.

* cited by examiner

DEVICE ARBITRATION BY MULTIPLE SPEECH PROCESSING SYSTEMS

CROSS REFERENCE TO RELATED APPLICATION

This application is a continuation of co-pending, commonly owned U.S. patent application Ser. No. 16/895,869, filed Jun. 8, 2020, which is a continuation of U.S. patent application Ser. No. 15/948,519, filed Apr. 9, 2018, and entitled "DEVICE ARBITRATION BY MULTIPLE SPEECH PROCESSING SYSTEMS," the entirety of which is herein incorporated by reference.

BACKGROUND

Homes, offices and other spaces are increasingly equipped with Internet connectivity. The constant, or nearly constant, availability of network communications, in combination with increasing capabilities of computing devices—including hands-free, speech interface devices, like Amazon's Echo and other Alexa enabled devices—have created a number of new possibilities for services. For example, various cloud-based services (e.g., music streaming, smart home control, etc.) are accessible to users through convenient, hands-free interaction with their speech interface devices. In some instances, multiple speech interface devices are in proximity to a user such that each speech interface device detects an utterance from the user.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1A:
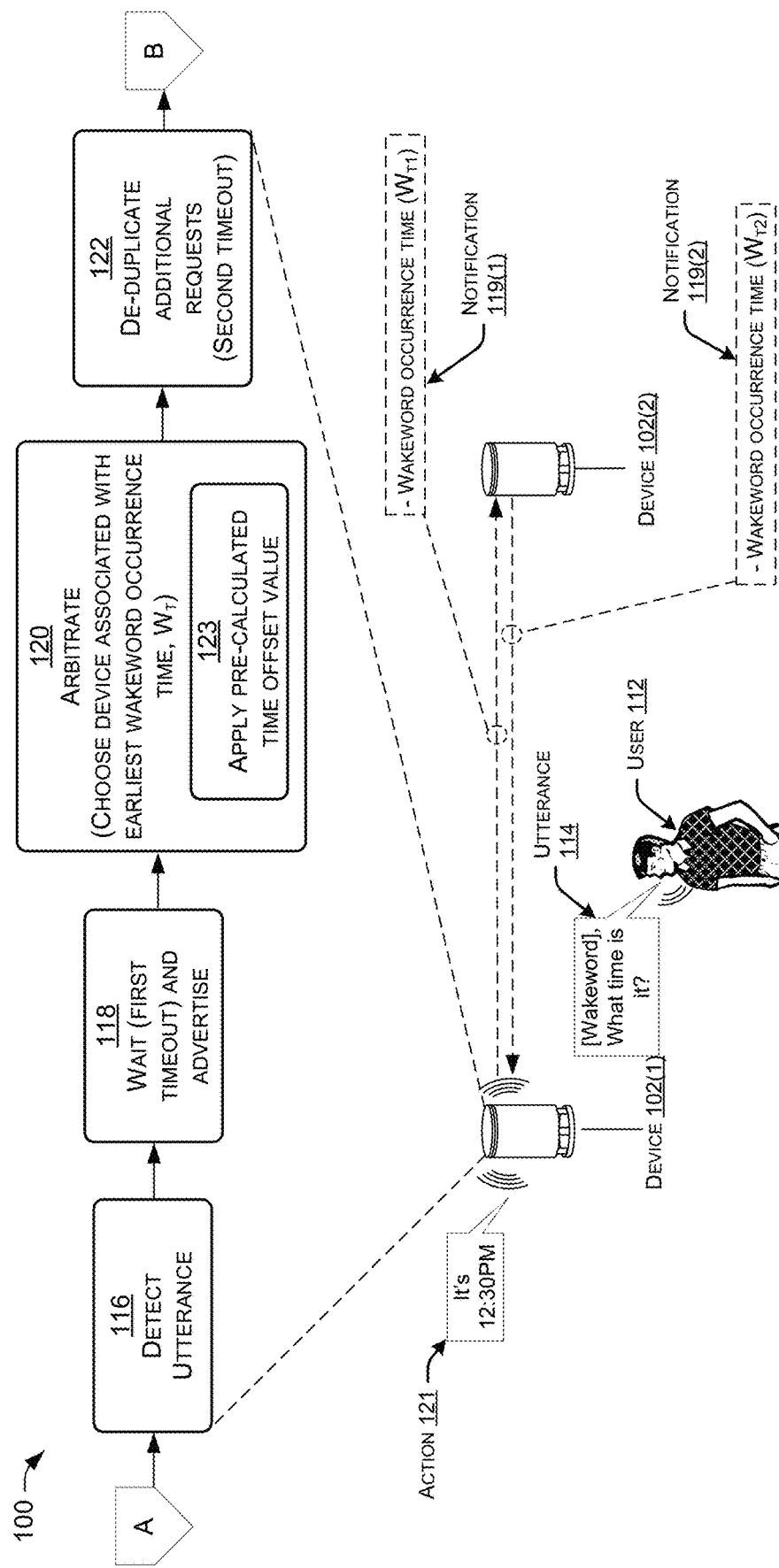
FIG. 1A is a schematic flow diagram illustrating a technique for performing time-based local device arbitration to designate a device to perform an action with respect to user speech.

Described herein are, among other things, techniques, devices, and systems, including a device configured to perform time-based local device arbitration, even when the device is unable to communicate with a remote system over a wide area network (e.g., the Internet). Device arbitration, in this sense, means designating—from among multiple speech interface devices which detect a speech utterance from a user—a most appropriate speech interface device to perform an action with respect to the user speech. In other words, device arbitration can be used to determine which device—among multiple devices that detected a single query (an utterance)—to designate for performing the action. To perform time-based local device arbitration, the device, upon detecting a wakeword in an utterance, can wait a period of time for data to arrive at the device, which, if received, indicates to the device that another speech interface device in the environment detected an utterance. If the device receives data prior to the period of time lapsing, the device can compare wakeword occurrence times to determine the earliest-occurring wakeword, and may designate whichever device that detected the wakeword first as the designated device to perform an action with respect to the user speech. To account for differences in sound capture latency between speech interface devices, a pre-calculated time offset value can be applied to wakeword occurrence times during device arbitration.

For instance, multiple speech interface devices (at least one being the aforementioned device) are individually configured to "listen" for a wakeword followed by an utterance. A speech interface device that detects the wakeword knows that the captured audio data is to be processed for determining an intent. In an example process, a user utters the wakeword followed by an expression, and the device may detect this utterance. The device may determine a first wakeword occurrence time, which corresponds to a time at which the device detected the wakeword in the user speech. The device can then wait an initial period of time—starting from a time at which the utterance was first detected at the device—for data to arrive at the device, which, if received, indicates to the device that another speech interface device in the environment detected an utterance. The device is tasked with deciding whether the arriving data corresponds to the same utterance or a different utterance. To make this determination, the device may use a time-based approach. If the device receives data prior to the period of time lapsing, the device can determine the earliest-occurring wakeword among multiple wakeword occurrence times of the devices that detected the utterance within that period of time. The device which detected the wakeword first can be designated as the device to perform an action with respect to the user speech. It is to be appreciated that various algorithms can be used to determine the earliest-occurring wakeword occurrence time, such as an algorithm that includes normalizing clock values from each device that detected the wakeword, and comparing the wakeword occurrence times based at least in part on the normalized clock values.

In some embodiments, a second period of time (e.g., a threshold time period) may be monitored for purposes of de-duplicating requests that arrive at the device after the initial period of time and within the second period of time. For example, if the device receives data (e.g., audio data) from another speech interface device after the initial period of time has lapsed, but prior to the second, longer period of time lapsing, the device may assume that the received data corresponds to the same utterance, and may delete the data (e.g., the audio data) to avoid duplicative processing of the same speech. If, however, the device receives data (e.g., audio data) after this second period of time has lapsed, the received data is assumed to correspond to a different utterance, and may be processed as a new utterance.

As mentioned, to account for differences in sound capture latency between speech interface devices in the environment, the device may pre-calculate a time offset value, which may be based on a sound pattern detection procedure that can be performed prior to detecting an utterance. For instance, multiple speech interface devices in an environment may (e.g., periodically) output a series of tones as a sound pattern, and may detect the sound patterns, including their own patterns. These sound patterns may encode timestamp data that can be used to calculate parameters, including a time offset value. This time offset value can be used by the device to synchronize the time outputs of different speech interface devices during device arbitration. For example, when a user utters the wakeword followed by an expression, the device can apply the time offset value to a wakeword occurrence time reported from another speech interface device in order to account for a difference in the capture latency between the device and the other speech interface device. Thus, when the device is performing device arbitration, the device can consider an adjusted wakeword occurrence time (e.g., adjusted by the time offset value) to more precisely determine which device in the environment detected the wakeword first.

A device that is capable of performing time-based local device arbitration, as described herein, can designate the most appropriate device for performing an action with respect to user speech in an environment, even in instances when the Internet is down, and/or when a remote system cannot otherwise be reached or is otherwise slow to respond. For example, even if the device is unable to communicate with the remote system, when a user utters the wakeword followed by an expression, and multiple speech interface devices in the environment detect the utterance, the device can designate a most appropriate device to perform an action with respect to the user speech based on wakeword occurrence times and using timeout periods, and the device can even process the user speech locally on behalf of speech interface devices that do not have local speech processing capabilities. Accordingly, the techniques and systems described herein allow for a designated device to perform an action with respect to a single utterance; rather than multiple devices performing the action with respect to the same utterance. In addition, multiple different utterances can still be handled independently using a timeout period, and, hence, a designated device can perform actions with respect to each different utterance. The techniques and systems described herein can also select a designated device—for performing an action with respect to user speech—that is likely to be the closest device to the sound source (e.g., the user), without knowing the topology or physical locations of the devices in the environment at a time when device arbitration is performed.

Figure 1B:
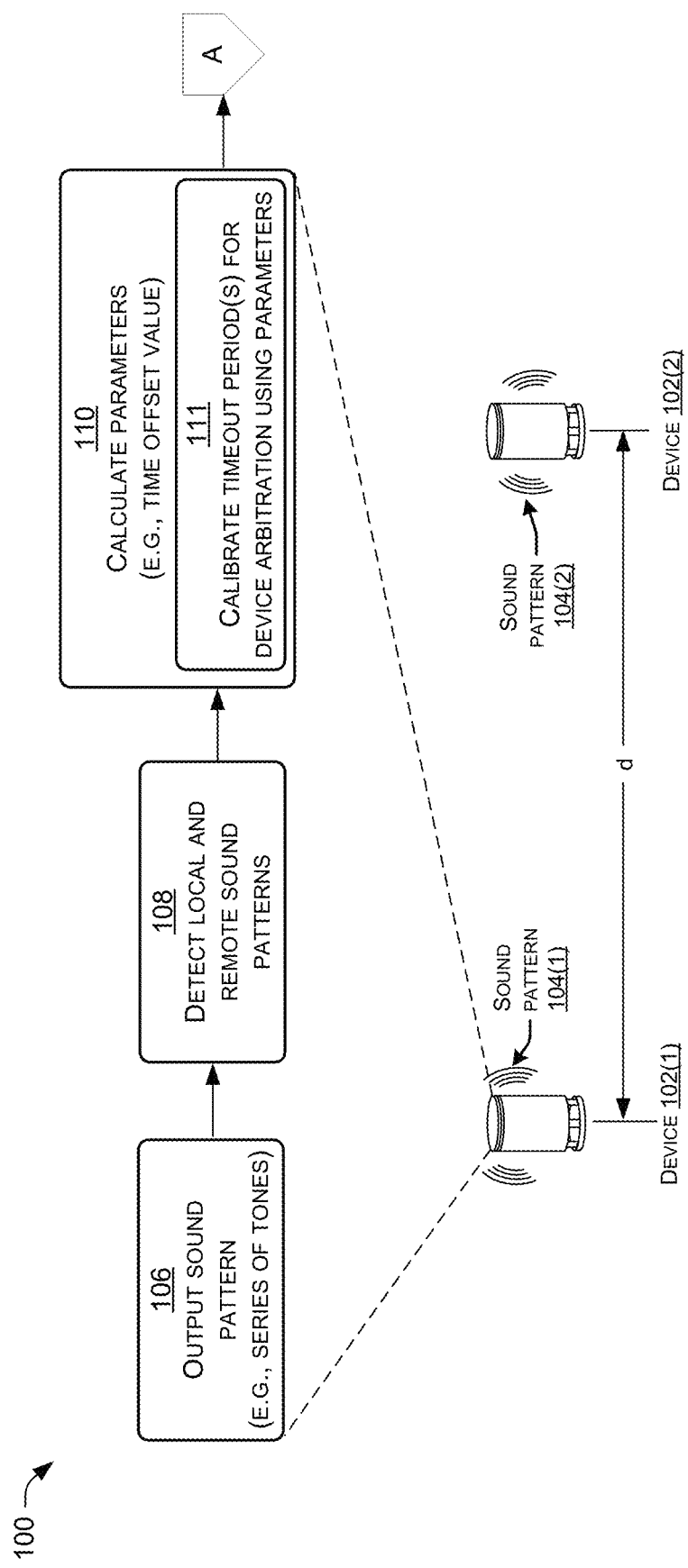
FIG. 1B is a schematic flow diagram illustrating a technique for using sound patterns emitted by speech interface devices in an environment to calculate parameters, including a time offset value, which can be used by a device to synchronize the time outputs of different speech interface devices during device arbitration.

FIG. 1A is a schematic flow diagram illustrating a time-based local device arbitration technique. FIG. 1B is a schematic flow diagram illustrating a technique for using sound patterns emitted by speech interface devices in an environment to calculate a time offset value. The time offset value calculated using the technique of FIG. 1B may (or may not) be utilized during device arbitration, as shown in FIG. 1A. When the time offset value is used during device arbitration, the time offset value may be used to synchronize the time outputs of different speech interface devices as will be described in more detail below. The off-page reference "A" in FIGS. 1A and 1B indicates, for example, that the operations of the process 100 shown in FIG. 1A may continue from the operations of the process 100 shown in FIG. 1B, and may, for instance, utilize the pre-calculated time offset value described with reference to FIG. 1B. However, the operations shown in FIG. 1A can also be performed without applying a pre-calculated time offset value, and, therefore, the operations shown in FIG. 1B may not precede the operations shown in FIG. 1A. The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

As shown in FIGS. 1A and 1B, a first device 102(1) may be collocated in an environment with a second device 102(2). The devices (collectively 102) may be configured to act, in an individual capacity, as a speech interface device by detecting user speech and responding to the user speech. However, it is to be appreciated that the techniques, devices, and systems described herein, or at least portions thereof, may be implemented by non-speech interface devices (e.g., devices that do not have a microphone or that are otherwise incapable of processing speech). For instance, the device 102, although depicted as a speech interface device in FIG. 1A, may be implemented as a refrigerator, a television (TV), or any other type of device that may be configured to communicate with other devices using any suitable communication protocol, and to perform device arbitration logic for designating an appropriate device to perform an action with respect to user speech detected by a separate speech processing device in the environment.

The environment in which the devices 102 are located may be a home or other premises, an automobile, or any similar environment. It is to be appreciated that the environment may further include other devices, including additional speech interface devices, such as other devices and/or other non-device speech interface devices, and/or second devices (e.g., Internet of Things (IoT) devices and/or smart home devices like thermostats, lights, refrigerators, ovens, etc.) that may be controllable by speech interface devices, such as the devices 102. The devices 102 may be configured as a "hubs" in order to connect a plurality of devices in the environment and control communications among them, thereby serving as a place of convergence where data arrives from one or more devices, and from which data is sent to one or more devices. Before detailing the algorithm of FIG. 1A, a brief explanation of some concepts behind the time-based approach may aid in the understanding of the time-based device arbitration techniques described herein.

It is well known that sound travels through dry air at 343 m/s, which means that sound travels about 2.91 milliseconds (ms) per meter of distance. If a user 112 is positioned M meters from the first device 102(1) of FIG. 1A, and N meters from the second device 102(2), and assuming N is a different value than M, then the devices 102 will notice a wakeword in an utterance 114 spoken by the user 112 at different times, and the difference between the perceived wakeword time, T, can be calculated as: T=|M−N|×2.91, in units of milliseconds (ms). For example, if the first device 102(1) is spaced 5 meters from the user 112, and the second device 102(2) is spaced 10 meters from the user 112, then T=|5−10|×2.91=14.55 ms. This means that the second device 102(2), in this example, will detect the wakeword 14.55 ms after the first device 102(1) detects the same wakeword. In other words, the closer device (to the user 112) will detect the wakeword first.

While a difference in the perceived wakeword time, T, on the order of tens of milliseconds may not seem like much, this is still greater than local area network latency (e.g., WiFi network latency), and it is still greater than a time synchronization accuracy that can be achieved between the devices 102. Accordingly, the time-based device arbitration techniques described herein are based at least in part on the notion that wakeword occurrence times are likely to differ between speech interface devices in an environment, and are likely to indicate which device is closest to the user 112, and therefore in a best position to perform an action with respect to the user speech.

That said, the difference in perceived wakeword time, T, between a pair of speech interface devices on the order of tens of milliseconds is also less than the time it takes to speak the wakeword (sometimes referred to as the "wakeword length"), and it is also less than the wakeword recognition latency (or the time it takes for the speech interface device to recognize the wakeword in an utterance 114), which can be on the order of 200 to 300 ms. In some cases, the difference in wakeword recognition latency between the pair of devices 102 can be greater than the time-space distance, D, between those devices. It is to be appreciated that another source of latency can be the sound capture latency on each speech interface device, which can range from a few milliseconds to hundreds of milliseconds, depending on the capture buffer sizes and hardware architecture of the individual devices. The difference sound capture latency between a pair of speech interface devices can also exceed the time-space distance, D, between those devices.

Now, to describe the device arbitration technique shown in FIG. 1A, consider an example where the user 112 utters the wakeword followed by the expression "What time is it?" The first device 102(1) may, at 116, detect this utterance 114 at a first time. Detecting the utterance at 114 may include capturing the utterance 114 via a microphone(s) of the first device 102(1) to generate first audio data. In the case of a non-speech interface implementation, the first device 102(1) may detect the utterance 114 at block 116 based on data it receives from another speech interface device in the environment. This can also be the case if the first device 102(1) is a speech interface device. For example, the utterance 114 can be detected based on data (e.g., audio data) received from another device. The first device 102(1) may also detect the wakeword in the utterance 114 at block 116. As mentioned, the wakeword indicates to the first device 102(1) that the first audio data it generated is to be processed using speech processing techniques to determine an intent of the user 112. Meanwhile, the second device 102(2) may generate second audio data based on its own detection of the utterance 114, including detection of the wakeword.

Each device 102 may also determine a wakeword occurrence time, $W_T$, which corresponds to a time at which the device 102 detected the wakeword in the user speech. Accordingly, at block 116, the first device 102(1) may estimate a first wakeword occurrence time, $W_{T1}$. Similarly, the second device 102(2) may estimate a second wakeword occurrence time, $WT_2$. In some embodiments, wakeword occurrence time estimation may include "looking back" at previously-recorded audio data (e.g., the audio signal waveform) to determine a time when the wakeword likely occurred. For example, determining a wakeword occurrence time may include analyzing an audio signal waveform that corresponds to the utterance and that spans a time interval, and estimating the wakeword occurrence time as a time within the time interval based at least in part on the analyzing of the audio signal waveform (e.g., using pattern recognition to isolate data corresponding to the wakeword in the audio signal waveform). This estimation can account for capture latency, processing latency, etc. In some embodiments, the device 102 may be configured to estimate a wakeword occurrence time, $WT_2$, of another speech interface device (e.g., the second device 102(2)) based at least in part on the time-of-arrival of a data at the device 102 from the other speech interface device, local device-to-device network latency, wakeword recognition delay or latency, and/or audio processing delay or latency.

At 118 of the process 100, the first device 102(1) may wait a period of time—starting from a first time at which the utterance 114 was first detected at the first device 102(1)—for data (e.g., audio data or notification data) to arrive at the first device 102(1) from other speech interface devices in the environment. This period of time may be a first timeout period that is sometimes referred to herein as "MIND" to indicate that the first timeout period represents the minimum amount of time that the first device 102(1) is configured to wait for data from other devices to arrive at the first device 102(1) before the first device 102(1) continues to respond to the user speech. It is to be appreciated that the first device 102(1) may detect the utterance 114 before it receives any data from another speech interface device, and, in this case, the first timeout period may start from a point in time that corresponds to the utterance 114 being detected by the first device 102(1). This starting time of the first timeout period may be a time when the first device 102(1) generates first audio data, a time when the first device 102(1) recognizes a wakeword in the audio data, or a similar event that indicates a time of utterance detection. To accommodate known differences in wakeword recognition latency across speech interface devices with various configurations, and to account for known sound capture differences between devices, the first timeout period (e.g., MIND) may be within a range of about 100 to 200 ms. In some embodiments, the first timeout period may be within a range of about 80 to 120 ms. Thus, the waiting operation at block 118 may add some latency to the entire process, but the impact of the additional latency is not expected to be noticeable to a human user.

At block 118, after detection of the utterance 114, the first device 102(1) may also "advertise" to other devices in the environment, such as the second device 102(2). This advertisement operation may include sending data (shown in FIG. 1A as a first notification 119(1)) to the second device 102(2) along with the wakeword occurrence time, $W_{T1}$, estimated by the first device 102(1). Similarly, assuming that the second device 102(2) detects the utterance 114 (or receives audio data from another speech interface device that detected the utterance), the second device 102(2) is configured "advertise" this utterance detection by sending data (shown in FIG. 1A as a second notification 119(2)) to other devices in the environment, such as the first device 102(1), along with the second wakeword occurrence time, $W_{T2}$, estimated by the second device 102(2), or a different speech interface device that detected the utterance. Accordingly, "notification 119," as used herein, represents data that is sent to other devices in the environment, and this notification data may not include audio data. For example, the second device 102(2) may have detected the utterance, and another speech interface device may have also detected the utterance and may have sent audio data to the second device 102(2). In this scenario, if the audio data received at the second device 102(2) from the other speech interface device is preferable (e.g., by having an earlier wakeword occurrence time associated therewith), the second device 102(2) may send the second notification 119(2) with the wakeword occurrence time associated with the other speech interface device, instead of its own wakeword occurrence time. In other words, the devices 102 may be configured to advertise the "best" local request to other devices 102 in the environment, where the "best" local request is determined based on one or more types of data, as described herein, at least one of those types of data being wakeword occurrence time.

It is to be appreciated that the timing of these notifications 119 may vary, and such timing may be a function of the time when each device 102 detects the utterance 114 (e.g., where the user 112 is located relative to the speech interface devices in the environment), as well as the various processing latencies, the latency of the local area network, and the like, which may affect when a notification 119(2) arrives at the first device 102(1) from the second device 102(2). For the sake of illustration, assume that the first device 102(1) detects the utterance 114 and generates first audio data at a first time, before any other audio data and/or notifications (e.g., the second notification 119(2)) arrive at the first device 102(1) from other speech interface devices in the environment. Then, assume that the first device 102(1) receives the second notification 119(2) from the second device 102(2)—along the second wakeword occurrence time, $W_{T2}$, estimated by the second device 102(2)—prior to a lapse of the period of time corresponding to the first timeout period at block 118. Having received the second notification 119(2) from the second device 102(2) within this first timeout period (e.g., MIND), the first device 102(1) may, at 120, perform time-based device arbitration to determine whether to designate the first device 102(1) or the second device 102(2) as a designated device to field the utterance 114. For example, the first device 102(1) may, at 120, designate the device with the earliest wakeword occurrence time as the designated device to perform an action with respect to the user speech. Thus, if the first device 102(1) determines, at 120, that the first wakeword occurrence time, $W_{T1}$, is earlier than (or precedes) the second wakeword occurrence time, $W_{T2}$, the first device 102(1) may designate itself to perform an action 121 with respect to the user speech. The action 121 may include continuing to capture the user speech corresponding to the utterance 114 via a microphone of the designated device. In other words, the device arbitration logic may determine a most appropriate device to "listen" for sound representing user speech in the environment. For instance, a duration of the utterance may be longer than the time it takes to perform device arbitration, and, as such, a designated device can be determined for continuing to "listen" to the utterance 114.

In some embodiments, the action 121 may include a responsive action that is responsive to the user speech. In other words, the device arbitration logic may determine a most appropriate device to "respond" to the utterance 114. In order to determine a responsive action 121 that is to be performed, a local speech processing component of the first device 102(1) may be used to process the first audio data generated by the first device 102(1) (e.g., by performing automatic speech recognition (ASR) on the first audio data, and by perform natural language understanding (NLU) on the ASR text, etc.) to generate directive data, which tells the first device 102(1) how to respond to the user speech. Accordingly, the action 121 performed by the designated device (which, in this example, is the first device 102(1)) may be based on locally-generated directive data that tells the first device 102(1) to, for instance, output an audible response with the current time (e.g., a text-to-speech (TTS) response saying "It's 12:30PM"). The action 121 can be any other suitable action as well, such as outputting content (e.g., music, video content, etc.) via an output device of the designated device, sending a command to a second device, the command instructing an operation to be performed at the second device to control the second device (e.g., turn on a light, adjust a thermostat, etc.). Accordingly, it is to be appreciated that other factors can be considered in determining which device to designate as a device to respond to the user speech, and this "responding" device may be the same device as the device chosen in the device arbitration logic, or a different device (e.g., a device with a display when the responsive action 121 is to display video content).

On the other hand, if the first device 102(1) determines, at 120, that the second wakeword occurrence time, $W_{T2}$, is earlier than (or precedes) the first wakeword occurrence time, $W_{T1}$, the first device 102(1) may designate the second device 102(2) to perform an action 121 with respect to the user speech. In this case, the first device 102(1) may not perform speech processing itself, because the second device 102(2) can, with its own local speech processing component, perform ASR and NLU on its own, locally-generated audio data to generate the directive data and perform the action 121 at the second device 102(2). In other words, the first device 102(1) may not do anything further if it determines that the second device 102(2) detected the wakeword first.

As shown by the sub-block 123, the first device 102(1) may synchronize the time outputs of the respective devices before performing device arbitration, such as by applying a time offset value (e.g., Equation (7), below, and calculated at block 110 in FIG. 1B) to the second wakeword occurrence time, $W_{T2}$, to obtain an adjusted second wakeword occurrence time, $W_{T2}$ adjusted. This time offset adjustment may effectively map the wakeword start point to real time on both of the devices 102, which controls for the difference in capture latency between the pair of device 102. Thus, the device arbitration at block 120 may include determining whether the first wakeword occurrence time, $W_{T1}$, is earlier than the adjusted second wakeword occurrence time, $W_{T2}$ adjusted. In some embodiments, the duration of the utterance 114 may be greater than the time offset value. As such, the arbitration decision can be made prior to the user 112 finishing the utterance 114.

At 122 of the process 100, the first device 102(1) may de-duplicate any "requests" that arrive at the first device 102(1) within a threshold time period (e.g., a second timeout period that is longer than the first timeout period). For example, if the first device 102(1) waits at block 118 for other notifications or audio data to arrive at the device 102(1), then proceeds to perform device arbitration at block 120 after a lapse of the first timeout period, and then receives a notification and/or audio data from another speech interface device at a second time prior to a lapse of a threshold time period, the first device 102(1) may infer that the received audio data and/or notification(s) corresponds to the same utterance 114, and may de-duplicate the requests by deleting the audio data (and/or ignoring a notification from another device) so that two actions are not output based on a single utterance 114. For instance, the first device 102(1) may initially detect the utterance 114 at a first time, and may receive audio data from another speech interface device at a second time, and may determine that a difference between the second time and the first time is less than the threshold time period, causing the first device 102(1) to delete the later-received audio data. The threshold time period for de-duplication purposes may correspond to a second timeout period (e.g., sometimes referred to herein as "MAXD"), which may represent a maximum time (or time difference) expected between two speech interface devices detecting the same utterance. Assuming, optimistically, that voice can be recognized at roughly 80 m indoors (about twice that of outdoors), and accommodating for latency differences, this second timeout period may be set within a range of about 300 to 500 milliseconds (ms). In some embodiments, the second timeout period may be set within a range of about 500 to 2000 ms. It is to be appreciated that the effect of setting this too high may cause a different utterance to be dropped, while too low may cause duplicate actions 121 to be performed for the same utterance 114. The second timeout period at block 122 may also be thought of as the minimum allowed time (or time difference) between two different utterances.

Although FIG. 1A depicts an example where time-based data is the type of data considered in the arbitration decision at block 120, it is to be appreciated that the device arbitration at block 120 may be based on additional types of data, which may be considered in combination with the "time-based data" that corresponds to the wakeword occurrence times, as described above. An example is "energy data", which may correspond to a signal strength value associated with a detected utterance. Such a signal strength value may be expressed as a signal to noise ratio (SNR) to indicate a comparison of the signal level (e.g., the power of the utterance) to the background noise level (e.g., the power of background noise in the environment). This signal strength value can be expressed in units of decibel (dB). Another example type of data that can be considered in the device arbitration logic of block 120 includes "contextual data." Contextual data may include a current state of the device(s) that detects an utterance. For instance, a current state of the device(s) may be specified as "playing music," "playing an alarm," "doing nothing," etc. The contextual data may also, or alternatively, include the last-used device (e.g., the speech interface device in the environment that most recently responded to user speech), as well as the amount of time that has transpired since the time of last use. The contextual data may also, or alternatively, include ASR and/or NLU output of a local speech processing component, which may not be available for use in device arbitration until audio data is processed using a local speech processing component in the environment, such as a local speech processing component of the first device 102(1).

When multiple types of data (e.g., time-based data and energy data) are used for device arbitration at block 120, the first device 102(1) may utilize a scoring approach to designate a device, whereby a device assigned the highest score may be designated to perform an action with respect to user speech, and wherein a relatively early wakeword occurrence time may correspond to a higher score, whereas a relatively late wakeword occurrence time may correspond to a lower score. Accordingly, the first device 102(1) may receive one or more speech recognition events based on multiple speech interface devices detecting the same utterance. In the example of FIG. 1A, the first device 102(1) may detect the utterance (e.g., a first speech recognition event), and may receive a second speech recognition event from the second device 102(2) in the form of the notification 119(2). This speech recognition event (e.g., the notification 119(2)) may include a second wakeword occurrence time, $W_{T2}$, (which constitutes time-based data), and may include an additional type of data in the form of an energy data, for example. This energy data may correspond to a second signal strength value (e.g., SNR) associated with audio data generated by, or received at, the second device 102(2) based on the utterance. The first device 102(1) may then generate a first score for itself, and a second score for the second device 102(2). The first score assigned to the first device 102(1) may be based on the first device's 102(1) time-based data (e.g., a first wakeword occurrence time, $W_{T1}$), and the first device's 102(1) energy data (e.g., a first signal strength value (e.g., SNR) associated with audio data generated by, or received at, the first device 102(1) based on the utterance). The second score assigned to the second device 102(2) may be based on the second device's 102(2) time-based data (e.g., a second wakeword occurrence time, $W_{T2}$), and the second device's 102(2) energy data (e.g., a second signal strength value (e.g., SNR) associated with audio data generated by, or received at, the second device 102(2) based on the utterance). In some embodiments, sub-scores can be computed for the time-based data and the energy data, those sub-scores can be translated to the same domain, and then the translated sub-scores can be used as a weighted average for a total "device score." In some embodiments, the time-based data may be used as fallback data for computing the device score when the energy data is unavailable or cannot be determined based on available data. In some embodiments, the time-based sub-scores and the energy sub-scores may be logged when they are not aligned (e.g., when a time-based sub-score for the first device 102(1) is higher than the time-based sub-score for the second device 102(2), yet the energy sub-score for the first device 102(1) is lower than the energy sub-score for the second device 102(2)). This logged data may be used to further validate the outcome of the device arbitration determination at block 120, for tuning the scoring algorithms (e.g., weights), and/or other purposes. It is to be appreciated that scores may be computed for devices whose audio data is deleted at block 122. For example, even if the first device 102(1) determines to delete a "late" request that arrives before the second timeout lapses at block 122, the first device 102(1) may nevertheless compute a device score (e.g., based on the time-based data and the energy data) and may log instances where a score associated with a device that was chosen, at block 120, to field the utterance is lower than a score associated with a device that sent audio data or a notification at a later point in time, and/or a device that detected the wakeword at a later point in time. In some embodiments, an arbitration determination can be corrected based on late-arriving data using a "retargeting" process, as described in more detail below with reference to FIG. 6.

The first device 102(1) can compare the first score (device score assigned to the first device 102(1)) and the second score (device score assigned to the second device 102(2)), and designate the device associated with the highest score as the designated device to perform the action with respect to user speech at block 120. The audio data associated with the designated device can then be processed locally, and audio data associated with devices that were not designated as the designated device can be deleted. Upon completion of local speech processing, directive data can be sent to, and/or processed by, the designated device, and the first device 102(1) may inform other devices that were not designated as the designated device to refrain from performing an action with respect to the user speech. It is to be appreciated that additional data, such as the contextual data described above, may be factored into the device score in a similar manner to that described above with respect to time-based data and energy data. For example, a first device that is currently playing music when an utterance is detected by the first device may have its score up-weighted based on the current state of that first device, whereas a second device that is currently doing nothing when an utterance is detected by the second device may have its score down-weighted based on the current state of that second device.

In regards to the energy data, this energy data (e.g., a signal strength value corresponding to audio data) may be computed in real-time as the speech interface device detects an utterance. Additionally, or alternatively, the energy data (e.g., a signal strength value) can be reconstructed based on the audio data that corresponds to a detected utterance. For instance, the first device 102(1) may receive audio data from another speech interface device, and may compute a signal strength value (energy data) associated with that audio data. In some embodiments, signal strength values computed by different speech interface devices may be aligned, such as by using a bias matrix, which transforms the raw energy data sub-score based on the type of speech interface device. To better understand the energy data, the following may be appreciated.

As sound travels through space, the sound gradually dissipates, decreasing in (perceived) energy at a rate (approximately) proportional to the square of the distance traveled (e.g., the sound pressure/amplitude decreases proportionally to the distance). Perceived volume decreases by about 6 dB for every doubling of the distance from the sound source. Assuming similar characteristics of speech interface devices that record sound to generate audio data, and assuming a lack of other objects in the sound path that would affect the measurement (e.g., a speech interface device may cause the locally perceived volume to be higher than in an open space), one may use the relative energy difference to determine the device that's closest to the source of the sound. The precision of such a measurement may be affected by self-noise of the microphone, and/or the microphone's response characteristics, and/or, other sound sources in the environment. In ideal conditions, energy-based measurement (energy data) can be more precise than a time-based approach (time-based data), and energy-based measurements are also not dependent on a common clock source. To calculate a SNR (e.g., the difference between signal level and noise level (in dB)), the average noise level may be captured before the measurement of the signal strength value, and the average noise level may be used as the reference noise floor to calculate the SNR. However, a noise source (such as a turned-on TV) may raise the noise level of the devices closer to the noise source. Also, a device farther from the measured signal source may have a higher signal strength value (e.g., SNR) because, in some instances, that device may be farther away from the noise source as well. Similarly, a speech interface device may cause another speech interface device farther from the sound source to report higher SNR values because self-noise may not be affected by other speech interface devices, while signal capture may be affected by other speech interface devices.

With this understanding, the first device 102(1)—in addition to considering respective wakeword occurrence times of the first and second devices—may, at block 120, determine a first signal strength value (energy data) associated with audio data generated by, or received at, the first device 102(1) based on the detected utterance 114, and the first device 102(1) may designate a device to perform the action with respect to the user speech based at least in part on the first signal strength value, and based at least in part on the respective wakeword occurrence times of multiple detected utterances. In some embodiments, the first device 102(1) may also receive a second signal strength value (energy data) from the second device 102(2) that is associated with audio data generated by, or received at, the second device 102(2) based on the utterance, and the first device 102(1) may consider both the first signal strength value associated with its own, locally-generated/received audio data, and the second signal strength value associated with the audio data generated by, or received at, the second device 102(2) in the process of determining which device to designate as the device to perform the action with respect to the user speech.

Race conditions can occur in multi-device scenarios, such as the scenario depicted in FIG. 1A. For instance, the operations of the process 100 shown in FIG. 1A assumes there is a link between multiple devices 102, and that the devices 102 are able to exchange information about requests (e.g., via notifications 119) within the first timeout (e.g., MIND). In some embodiments, a best-effort implementation of the logic described in FIG. 1A may be prone to some race conditions, which can be mitigated by, for example, deleting audio data associated with a later-arriving notification 119 in lieu of audio data associated with an earlier-arriving notification 119 at block 122. In some embodiments, multiple devices 102 can perform a master election procedure to elect a master device 102 in the environment that is delegated to make device arbitration determinations (including determinations that involve designating another device in the environment as a designated device to field the utterance), which can also, or alternatively, mitigate some race conditions. This master election procedure can use any suitable technique, such as electing a device 102 with the lowest Internet Protocol (IP) address, a lowest Media Access Control (MAC) address, an earliest device registration time, etc., to be a master device.

FIG. 1B is a schematic flow diagram illustrating a technique for using sound patterns emitted by speech interface devices in an environment to calculate a time offset value, which can be used by a device to synchronize the time outputs of different speech interface devices during device arbitration. As shown by the off-page reference "A" in FIGS. 1A and 1B, the portion of the process 100 shown in FIG. 1B may precede the portion of the process 100 shown in FIG. 1A.

As mentioned, the speech interface devices disclosed herein, such as the devices 102, are each capable of capturing sound and outputting (or playing back) sound within the environment. For instance, each of the devices 102 may include one or more microphones to capture sound in the environment, and one or more speakers to output sound in the environment. Whenever sound is captured, there are inherent delays, or latencies, in capturing the sound at each speech interface device (e.g., at each of the first device 102(1) and the second device 102(2)). Similarly, whenever sound is output, there are inherent delays, or latencies, in outputting (or playing back) the sound from each speech interface device. FIG. 1B illustrates a technique for compensating for differences in these latencies.

As shown in FIG. 1B, each device 102 outputs a sound pattern 104 via its speaker(s), the sound pattern representing the time at origin of the device outputting the sound pattern 104. Each device 102 also captures the sound patterns 104 it can detect in the environment, including its own sound pattern 104. The process 100 shown in FIG. 1B illustrates a technique that may be implemented by the first device 102(1) in this context. For example, the first device 102(1) may, at 106, output a first sound pattern 104(1) (e.g., by outputting a first series of tones). Meanwhile, the second device 102(2) may output a second sound pattern 104(2) (e.g., by outputting a second series of tones). An individual sound patterns 104, such as the first sound pattern 104(1) output by the first device 102(1) at block 106, can be output as a series of tones (e.g., a "chirp") that can be detected by other speech interface devices in the environment. The series of tones may correspond to a particular waveform (audio signal). In some embodiments, the series of tones that make up a sound pattern 104 may be output at a frequency that is inaudible to the human ear (sometimes known as "high frequency audio (HFA)"). A frequency at which tones are output using HFA may be greater than a threshold frequency (e.g., greater than about 20 kilohertz (kHz)). In this manner, humans in the vicinity of devices may be unable to hear the tones of the sound patterns 104, yet the devices (e.g., the devices 102, and possibly other speech interface devices in the environment) are able to detect the sound patterns 104.

The sound patterns 104 may carry encoded timestamp data that represents the time at origin of the device outputting the sound pattern 104. For example, the first sound pattern 104(1) may include a first series of tones that encode first timestamp data associated with a first clock of the first device 102(1), and the second sound pattern 104(2) may include a second series of tones that encode second timestamp data associated with a second clock of the second device 102(2).

Between any pair of devices, such as the pair of devices 102 in FIG. 1B, five variables can be defined. The first variable, A, is the playback latency of the first device 102(1). The second variable, B, is the playback latency of the second device 102(2). The playback latency, in this context, may be thought of as the amount of time it takes a device to process an audio signal through an audio output pipeline of the device and to ultimately output sound from a speaker(s) of the device. The third variable, X, is the capture latency of the first device 102(1). The fourth variable, Y, is the capture latency of the second device 102(2). The capture latency may be thought of as the amount of time it takes a device to capture sound via a microphone(s) of the device and to process that sound into an audio signal. The fifth variable, D, is the time-space distance between the pair of devices 102. The time-space distance between a pair of devices can be thought of as the time it takes for sound to travel from one device to the other device. Because the speed of sound is a constant 343 meters per second (m/s), sound travels at about 2.91 milliseconds (ms) per meter of distance. Thus, if the first device 102(1) is spaced a distance, d (in meters), from the second device 102(2), the time-space distance, D, between the pair of devices 102 is 2.91×d. However, because the value of d (the distance in meters between the pair of devices 102) is unknown to the first device 102(1), the time-space distance, D, is treated as the fifth unknown variable here.

As mentioned, each device 102 captures (or detects) both local and remote sound patterns 104. For example, the first device 102(1) may detect, via a microphone of the first device 102(1), the first series of tones (corresponding to the first sound pattern 104(1)) output from a speaker(s) of the first device 102(1), and the first device 102(2) may also detect the second series of tones (corresponding to the second sound pattern 104(2)) output from the second device 102(2). The second device 102(1) may also capture both sound patterns 104(1) and 104(2). Accordingly, at 108 of the process 100, after sound patterns 104 are played and detected at each device 102, the first device 102(1) can obtain four time deltas (or "time difference values") using the timestamp data encoded in the series of tones along with capture times of the series of tones. A first time difference value, T1, is the time delta for the sound pattern 104(1) to be output from the first device 102(1) and subsequently perceived (or detected) at the first device 102(1). A second time difference value, T2, is the time delta for the sound pattern 104(2) to be output from the second device 102(2) and subsequently perceived (or detected) at the second device 102(2). A third time difference value, T3, is the time delta for the sound pattern 104(1) to be output from the first device 102(1) and subsequently perceived (or detected) at the second device 102(2). A fourth time difference value, T4, is the time delta for the sound pattern 104(2) to be output from the second device 102(2) and subsequently perceived (or detected) at the first device 102(1). The second device 102(2) may be configured to send the time difference values for sound patterns 104 detected at the second device 102(2) to the first device 102(1), and vice versa. In other words, time difference values can be exchanged amongst the speech interface devices in the environment so that a single device (e.g., the first device 102(1)) can obtain all four time difference values.

Taking into consideration which types of latencies (e.g., playback latencies (A, B), capture latencies (X, Y), etc.) influence each of the time difference values, one can arrive at the following equations that represent the four time difference values:

$$A+X=T1 \qquad (1)$$

$$B+Y=T2 \qquad (2)$$

$$A+Y+D=T3 \qquad (3)$$

$$B+X+D=T4 \qquad (4)$$

It is to be appreciated that the first time difference value, T1, is influenced by the playback latency, A, of the first device 102(1) and by the capture latency, X, of the first device 102(1). Similarly, the second time difference value, T2, is influenced by the playback latency, B, of the second device 102(2) and by the capture latency, Y, of the second device 102(2). The third and fourth time difference values, T3 and T4, are further influenced by the time-space distance, D, between the pair of devices 102. This is because of the travel time of the sound pattern 104 from one device to the other. The timestamp data that is encoded in the sound patterns 104 (e.g., in the series of tones) may inform a device that captures a sound pattern 104 of a time that the sound pattern 104 was played back, and the capturing device can then use this timestamp data, along with its own capture time (when the sound pattern 104 is detected), to calculate a time difference value, and the devices can exchange these time difference values to obtain T1-T4. Equations (1)-(4) can be reduced by subtracting even/odd rows together to obtain the following equations:

$$(X-Y)-D=(T1-T3) \quad (5)$$

$$(X-Y)+D=(T4-T2) \quad (6)$$

Equations (5) and (6) can then be used to compute the following two parameters:

$$(X-Y) = \frac{((T1-T3)+(T4-T2))}{2} \quad (7)$$

$$D = \frac{((T4-T2)+(T1-T2))}{2} \quad (8)$$

Equation (7) is a "time offset value" that represents a difference between X (the capture latency of the first device 102(1)) and Y (the capture latency of the second device 102(2)). Accordingly, at 110 of the process 100, the first device 102(1) can calculate this time offset value (sometimes called the "capture delta"), and this time offset value can be used to, among other things, synchronize the time outputs from the pair of device 102 during real-time device arbitration, as described in more detail below. In some embodiments, this time offset value of Equation (7) can be recalculated periodically (e.g., every hour). In some embodiments, the time offset value can be recalculated based on the occurrence of an event, such as a device power-cycling. For example, if a user unplugs a device 102 and plugs the device 102 back into a power outlet, the device 102 will have been powered off and subsequently powered on (e.g., power-cycled). The occurrence of such an event can be used to trigger the calculation of the time offset value again. This is beneficial if the user actually moves the device 102 to a different location, and, hence, the time offset value may be affected by the new location of the device 102. Other triggering events for recalculating the time offset value may include, without limitation, determining when a user's presence is not detected, determining when the user has left the environment (e.g., a security system being armed, a front door being locked from the outside, etc.), determining when there is no content (e.g., music) being played via devices in the environment.

Equation (8) represents the time-space distance, D, between the pair of devices 102, which corresponds to the amount of time it takes sound to travel from the second device 102(2) to the first device 102(1), and vice versa. In some embodiments, the technique shown in FIG. 1B may be performed multiple times in a row to iteratively calculate the time-space distance, D, of Equation (8), which may provide an indication of whether there is a drift between the respective clocks of the pair of devices 102. For example, if the time-space distance, D, increases with each calculation, it can be inferred that there is a drift between the respective clocks of the devices 102, and the devices 102 can predict this drift using a mathematical function, which, in turn, may be used to account for the drift over time without having to frequently recalculate the time-space distance, D. Furthermore, iterating the technique of FIG. 1B may allow for recalibration when, for example, a user moves one or more of the devices 102 to a new location within the environment.

As shown by the sub-block 111 in FIG. 1B, the parameters calculated at block 110 (e.g., the parameters of Equations (7) and/or (8)) can be used to calibrate (or otherwise determine) one or more timeout periods that are to be utilized during real-time device arbitration, as described herein. For instance, the time offset value of Equation (7) can be used to determine an initial (first) timeout period that is sometimes referred to herein as "MIND". In an example, the speech interface device (e.g., the first device 102(1)) may calculate time offset values for unique pairs of devices in the environment, determine a maximum time offset value among multiple time offset values calculated, and determine the initial (first) timeout period as a sum of the maximum time offset value and a network latency value associated with a local area network (See FIG. 5 for an example technique for calculating a network latency value). In other words, a first time offset value may represent a difference in sound capture latencies between the first device 102(1) and a first speech interface device (e.g., the second device 102(2)), and a second time offset value may represent a difference in sound capture latencies between the first device 102(1) and a second speech interface device collocated in the environment, and the maximum time offset value among the first and second time offset values may be added to a calculated network latency value to determine the initial (first) timeout period. This MIND timeout period may represent the minimum amount of time (e.g., a period of time) that the first device 102(1) is configured to wait for audio data or notifications to arrive at the first device 102(1) from other devices after the first device 102(1) has detected an utterance. This was described with respect to block 118 of FIG. 1A, and will be described with respect to block 218 of FIG. 2, and block 318 of FIG. 3. As another example, the time-space distance, D, of Equation (8) can be used to determine a second timeout period (e.g., a threshold time period) that is sometimes referred to herein as "MAXD". This MAXD timeout period may represent a maximum time (or time difference) expected between two speech interface devices detecting the same utterance, and was described with respect to block 122 of FIG. 1A, and will be described with respect to block 222 of FIG. 2, block 322 of FIG. 3, and the process 400 of FIG. 4.

Although two devices 102 are shown in FIG. 1B, it is to be appreciated that the technique illustrated in FIG. 1B can be performed between any pair of speech interface devices, including those that are non-device speech interface devices. In other words, speech interface devices that do not have local speech processing capabilities (except for a wakeword detection engine) may be involved in the sound pattern detection procedure to calculate parameters, including a time offset value. For example, a device 102 may output, via a speaker of the device 102, a first series of tones (corresponding to a first sound pattern 104(1)), and may detect, via a microphone of the device 102, the first series of tones, as well as a second series of tones (corresponding to a second sound pattern 104(2)) output from a speaker of a speech interface device that is not a device itself. Additionally, or alternatively, two non-device speech interface devices can perform the sound pattern detection procedure of FIG. 1B in a similar manner. Accordingly, the technique shown in FIG. 1B is not limited to implementation by a pair of devices 102 that have local speech processing capabilities.

Figure 2:
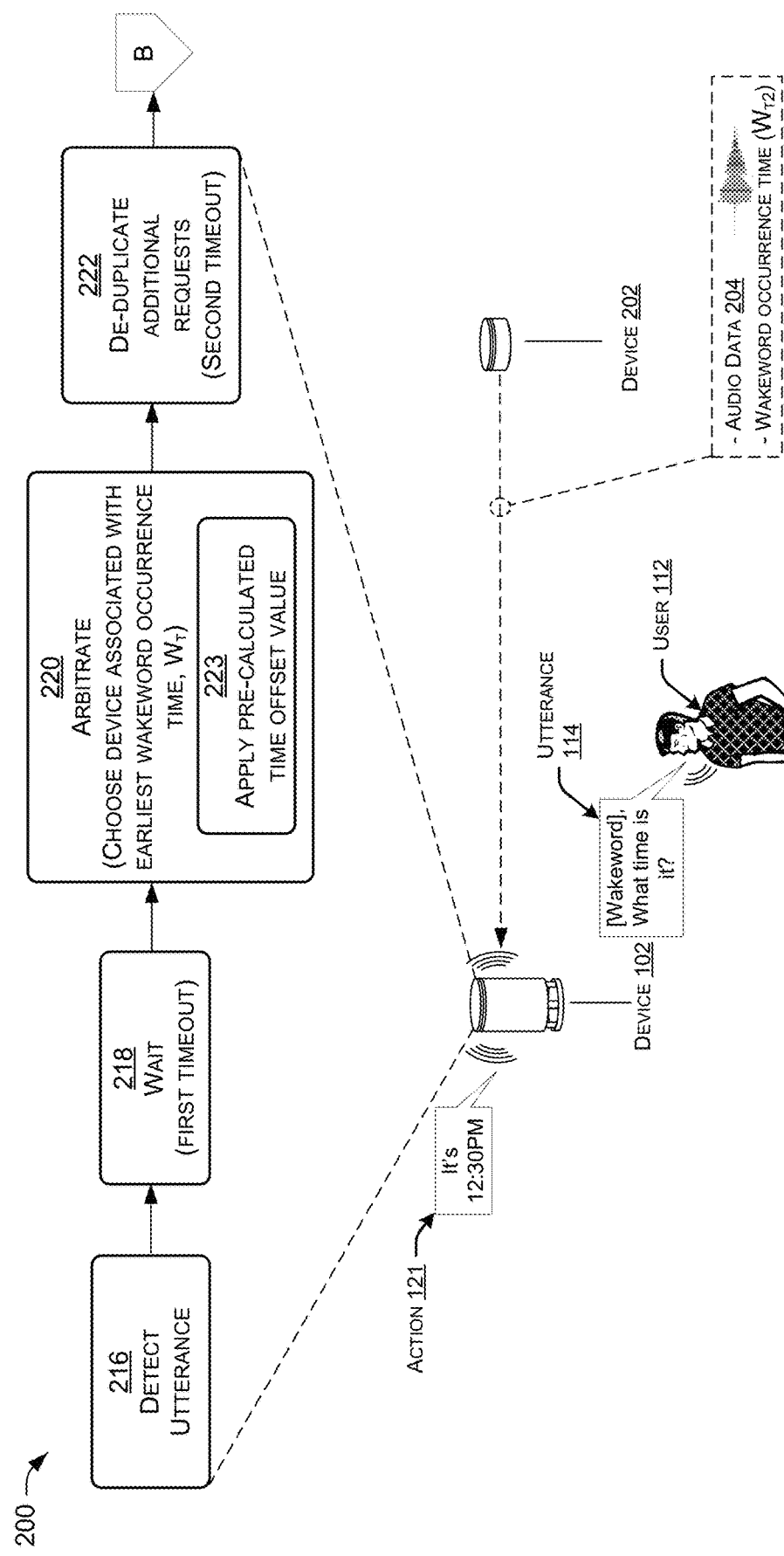
FIG. 2 is a schematic diagram illustrating a technique for performing time-based local device arbitration to designate a device to perform an action with respect to user speech.

FIG. 2 is a schematic diagram illustrating a technique for performing time-based local device arbitration to designate a device to perform an action with respect to user speech. FIG. 2 shows a device arbitration technique that is similar to the technique described with reference to FIG. 1A, a difference being that a device 102 may be collocated in an environment with a device 202 that is not capable of processing speech locally, other than detecting a wakeword in an utterance 114. Thus, in FIG. 2, when an utterance 114 is detected by the device 102 and by the device 202, the device 202 is configured to send data (e.g., audio data 204) to the device 102, along with a wakeword occurrence time, $W_{T2}$, which corresponds to an estimated time at which the device 202 detected a wakeword in the user speech. The device 102 may be configured to process the audio data 204 on behalf of the device 202 using a local speech processing component of the device 102.

Accordingly, a process 200 may be implemented by the device 102 for performing time-based local device arbitration, and this process 200 may, in some cases, follow a process similar to the operations of the process 100 described with reference to FIG. 1B. That is, the device 102 may have, at some earlier time, output a sound pattern 104 and detected this sound pattern 104, as well as a sound pattern output by the device 202, in order to calculate a time offset value that can be used in the process 200.

At 216 of the process 200, the device 102 may detect an utterance 114. Assume, for the sake of illustration, that the utterance 114 is detected by the device 102 before the device 102 receives audio data 204 from the device 202. Accordingly, the first timeout period is started at block 216 upon detecting the utterance 114 (e.g., upon generating audio data based on the utterance 114, detecting a wakeword in the utterance 114, etc.), and the device 102 waits for a period of time at block 218 to allow audio data or notifications to arrive at the device 102 within the first timeout period. Assume, for the sake of illustration, that the audio data 204 (and the wakeword occurrence time, $W_{T2}$) arrives from the device 202 at the device 102 within the first timeout period at block 218.

At 220 of the process 200, the device 102 may perform time-based device arbitration to determine whether to designate the device 102 or the device 202 as a designated device to field the utterance 114. For example, the device 102 may, at 220, designate the device with the earliest wakeword occurrence time as the designated device to perform an action with respect to the user speech. Thus, if the device 102 determines, at 220, that the first wakeword occurrence time, $W_{T1}$, (the time the device 102 perceived the wakeword) is earlier than (or precedes) the second wakeword occurrence time, $W_{T2}$ (the time the device 202 perceived the wakeword), the device 102 may designate itself to perform an action 121 with respect to the user speech in a similar manner to that described above with reference to FIG. 1A. If, on the other hand, the device 102 determines that the second wakeword occurrence time, $W_{T2}$, is earlier than (or precedes) the first wakeword occurrence time, $W_{T1}$, the device 102 may designate the device 202 to perform the action 121 with respect to the user speech. As mentioned, the action 121 may include continuing to capture the user speech corresponding to the utterance 114 via a microphone of the designated device. In other words, the device arbitration logic may determine a most appropriate device to "listen" for sound representing user speech in the environment. For instance, a duration of the utterance may be longer than the time it takes to perform device arbitration, and, as such, a designated device can be determined for continuing to "listen" to the utterance 114. Regardless of which device was designated as the device to perform the action, the device 102 may use its local speech processing component to process audio data. For example, the device 102 may use its local speech processing component to process the audio data 204 it received from the device 202 (e.g., by performing ASR on the audio data 204, and by perform NLU on the ASR text, etc.) to generate directive data. This directive data can then be sent to the device 202 in order to instruct the device 202 regarding how to respond to the user speech. In the example of FIG. 2, however, the device 102 determines that its wakeword occurrence time, $W_{T1}$, is earlier than (or precedes) the speech interface device's 202 wakeword occurrence time, $W_{T2}$, and, as a result, the action 121 is performed by the designated device (which, in this example, is the device 102). The action 121 may be based on locally-generated directive data that tells the device 102 to, for instance, output an audible response with the current time (e.g., a text-to-speech (TTS) response saying "It's 12:30PM").

As shown by the sub-block 223, the device 102 may synchronize the time outputs of the respective devices before performing device arbitration, such as by applying the time offset value (e.g., Equation (7), above) that it may have pre-calculated using a technique similar to that shown in FIG. 1B, but with the device 202. In this manner, the second wakeword occurrence time, $W_{T2}$, may be adjusted to derive an adjusted second wakeword occurrence time, $W_{T2}$ adjusted. This time offset adjustment may effectively map the wakeword start point to real time on both of the device 102 and the device 202, which controls for the difference in capture latency between the pair of devices 102/202.

At 222 of the process 200, the device 102 may de-duplicate any "requests" that arrive at the device 102 within a threshold time period (e.g., a second timeout period that is longer than the first timeout period). For example, if the device 102 waits at block 218 for other notifications or audio data to arrive at the device 102, proceeds to perform device arbitration at block 220 after a lapse of the first timeout period, and then receives a notification and/or audio data from another speech interface device prior to a lapse of a threshold time period corresponding to a second timeout period (e.g., "MAXD"), the device 102 may infer that the received audio data and/or notification(s) corresponds to the same utterance 114, and may de-duplicate by deleting the audio data, and/or ignoring the notification so that two actions are not output based on a single utterance 114.

It is to be appreciated that the device arbitration at block 220 may be based on additional types of data, which may be considered in combination with the aforementioned "time-based data" that corresponds to the wakeword occurrence times. An example is "energy data", which may correspond to a signal strength value (e.g., SNR) associated with a detected utterance. Another example type of data that can be considered in the device arbitration logic of block 220 includes the aforementioned "contextual data" (e.g., a current state of the device(s) that detects an utterance, a last-used device, an ASR and/or NLU output, etc.).

When multiple types of data (e.g., time-based data and energy data) are used for device arbitration at block 220, the device 102 may utilize a scoring approach to designate a device, whereby a device assigned the highest score may be designated to perform an action with respect to user speech. Accordingly, the device 102 may receive one or more speech recognition events based on multiple speech interface devices detecting the same utterance. In the example of FIG. 2, the device 102 may detect the utterance (a first speech recognition event), and may receive a second speech recognition event from the device 202 in the form of the audio data 204. This speech recognition event (e.g., the received audio data 204) may include a second wakeword occurrence time, $W_{T2}$, (which constitutes time-based data), and may include an additional type(s) of data in the form of energy data, for example. This energy data may correspond to a second signal strength value (e.g., SNR) associated with audio data generated by the device 202 based on the utterance. The device 102 may then generate a first score for itself, and a second score for the device 202. The first score assigned to the device 102 may be based on the device's 102 time-based data (e.g., a first wakeword occurrence time, $W_{T1}$), and the device's 102 energy data (e.g., a first signal strength value (e.g., SNR) associated with audio data generated by, or received at, the device 102 based on the utterance). The second score assigned to the device 202 may be based on the speech interface device's 202 time-based data (e.g., a second wakeword occurrence time, $W_{T2}$), and the speech interface device's 202 energy data (e.g., a second signal strength value (e.g., SNR) associated with audio data generated by the speech interface device based on the utterance). In some embodiments, sub-scores can be computed for the time-based data and the energy data, the sub-scores can be translated to the same domain, and then the translated sub-scores can be used as a weighted average for computing a total "device score." In some embodiments, the time-based data may be used as fallback data when the energy data is unavailable or cannot be determined based on available data. In some embodiments, the time-based sub-scores and the energy sub-scores may be logged when they are not aligned (e.g., when a time-based sub-score for the device 102 is higher than the time-based sub-score for the device 202, yet the energy sub-score for the device 102 is lower than the energy sub-score for the device 202). This logged data may be used to further validate the outcome of the device arbitration determination at block 220, for tuning the scoring algorithms (e.g., weights), and/or for other purposes. It is to be appreciated that scores may be computed for devices whose audio data is deleted at block 222. For example, even if the device 102 determines to delete a "late" request that arrives before the second timeout lapses at block 222, the device 102 may nevertheless compute a device score (e.g., based on the time-based data and the energy data) and may log cases where a score associated with a device that was chosen, at block 220, to field the utterance is lower than a score associated with a device that sent audio data at a later point in time, and/or that detected the wakeword at a later point in time. In some embodiments, an arbitration determination can be corrected based on late-arriving data using a "retargeting" process, as described in more detail below with reference to FIG. 6.

The device 102 can compare the first score (device score assigned to the device 102) and the second score (device score assigned to the device 202), and designate the device associated with the highest score as the designated device to perform the action with respect to user speech at block 220. The audio data associated with the designated device can be processed locally, and audio data associated with devices that were not designated as the designated device can be deleted. Upon completion of local speech processing, directive data can be sent to, and/or processed by, the designated device, and the device 102 may inform other devices that were not designated as the designated device to refrain from performing an action with respect to the user speech. It is to be appreciated that additional types of data, such as the aforementioned contextual data, may be factored into the device score in a similar manner.

Figure 3:
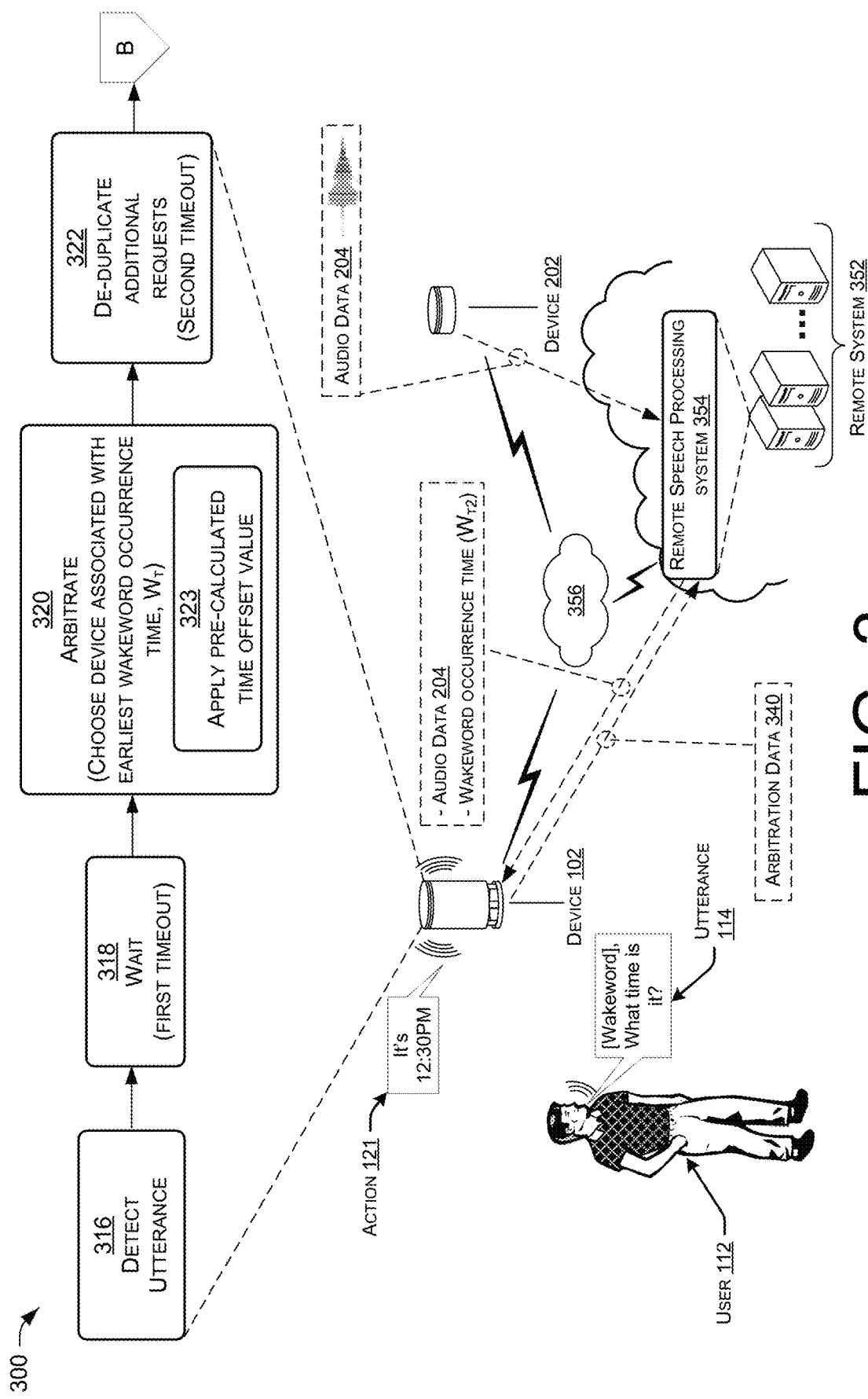
FIG. 3 is a schematic diagram illustrating a technique for performing time-based local device arbitration to designate a device to perform an action with respect to user speech.

FIG. 3 is a schematic diagram illustrating a technique for performing time-based local device arbitration to designate a device to perform an action with respect to user speech. FIG. 3 shows a device arbitration technique that is similar to the techniques described with reference to FIG. 2, a difference being that the device 202 may not be capable of communicating directly with the device 102, but the device 202 may be capable of communicating with a remote speech processing system 354 of a remote system 352. The remote system 352 may, in some instances be part of a network-accessible computing platform that is maintained and accessible via a wide area network 356. Thus, in FIG. 3, when an utterance 114 is detected by the device 102 and by the device 202, the device 202 is configured to send audio data 204 to the remote speech processing system 354. The remote speech processing system 354 may be configured to process the audio data 204 on behalf of the device 202, determine that the audio data 204 is from a device 202 that is associated with the same user account as the device 102, and send data to the device 102, which may include the audio data 204, a wakeword occurrence time, $W_{T2}$, which corresponds to an estimated time at which the device 202 detected a wakeword in the user speech, and possibly other data including, a device identifier (ID) of the device 202, additional timestamp data, etc.

Accordingly, a process 300 may be implemented by the device 102 for performing time-based local device arbitration, and this process 300 may, in some cases, follow a process similar to the operations of the process 100 described with reference to FIG. 1B. That is, the device 102 may have, at some earlier time, output a sound pattern 104 and detected this sound pattern 104, as well as a sound pattern output by the device 202, in order to calculate a time offset value that can be used in the process 300.

At 316 of the process 300, the device 102 may detect an utterance 114. Assume, for the sake of illustration, that the utterance 114 is detected by the device 102 before the device 102 receives data from the remote system 352. Accordingly, the first timeout period is started at block 316 upon detecting the utterance 114 (e.g., upon generating audio data based on the utterance 114, detecting a wakeword in the utterance 114, etc.), and the device 102 waits for a period of time at block 318 to allow audio data or notifications to arrive at the device 102 within the first timeout period. Assume, for the sake of illustration, that data (e.g., the audio data 204 and the wakeword occurrence time, $W_{T2}$) arrives from the remote system 352 at the device 102 within the first timeout period at block 318.

At 320 of the process 300, the device 102 may perform time-based device arbitration to determine whether to designate the device 102 or the device 202 as a designated device to field the utterance 114. For example, the device 102 may, at 320, designate the device with the earliest wakeword occurrence time as the designated device to perform an action with respect to the user speech. Thus, if the device 102 determines, at 320, that the first wakeword occurrence time, $W_{T1}$, (the time the device 102 perceived the wakeword) is earlier than (or precedes) the second wakeword occurrence time, $W_{T2}$ (the time the device 202 perceived the wakeword), the device 102 may designate itself to perform an action 121 with respect to the user speech in a similar manner to that described above with reference to FIG. 1A. If, on the other hand, the device 102 determines that the second wakeword occurrence time, $W_{T2}$, is earlier than (or precedes) the first wakeword occurrence time, $W_{T1}$, the device 102 may designate the device 202 to perform the action 121 with respect to the user speech. As mentioned, the action 121 may include continuing to capture the user speech corresponding to the utterance 114 via a microphone of the designated device. In other words, the device arbitration logic may determine a most appropriate device to "listen" for sound representing user speech in the environment. For instance, a duration of the utterance may be longer than the time it takes to perform device arbitration, and, as such, a designated device can be determined for continuing to "listen" to the utterance 114. Regardless of which device was designated as the device to perform the action, the device 102 may use its local speech processing component to process audio data. For example, the device 102 may use its local speech processing component to process the audio data 204 it received from the remote system 352 (e.g., by performing ASR on the audio data 204, and by perform NLU on the ASR text, etc.) to generate directive data. This directive data can then be sent to the remote system 352, which may forward the directive data, or send different directive data, to the device 202 in order to instruct the device 202 regarding how to respond to the user speech. In the example of FIG. 3, however, the device 102 determines that its wakeword occurrence time, $W_{T1}$, is earlier than (or precedes) the speech interface device's 202 wakeword occurrence time, $W_{T2}$, and, as a result, the action 121 is performed by the designated device (which, in this example, is the device 102). The action 121 may be based on locally-generated directive data that tells the device 102 to, for instance, output an audible response with the current time (e.g., a text-to-speech (TTS) response saying "It's 12:30PM").

As shown by the sub-block 323, the device 102 may synchronize the time outputs of the respective devices before performing device arbitration, such as by applying the time offset value (e.g., Equation (7), above) that it may have pre-calculated using a technique similar to that shown in FIG. 1B, but with the device 202. In this manner, the second wakeword occurrence time, $W_{T2}$, may be adjusted to derive an adjusted second wakeword occurrence time, $W_{T2}$ adjusted. This time offset adjustment may effectively map the wakeword start point to real time on both of the device 102 and the device 202, which controls for the difference in capture latency between the pair of devices 102/202.

As part of the arbitration operation(s) at block 320, the device 102 may send arbitration data 340 to the remote system 352, which may indicate which device was chosen by the device 102 to perform the action 121 with respect to the user speech.

At 322 of the process 300, the device 102 may de-duplicate any "requests" that arrive at the device 102 within a threshold time period (e.g., a second timeout period that is longer than the first timeout period). For example, if the device 102 waits at block 318 for other notifications or audio data to arrive at the device 102, proceeds to perform device arbitration at block 320 after a lapse of the first timeout period, and then receives a notification and/or audio data from another speech interface device prior to a lapse of a threshold time period corresponding to a second timeout period (e.g., "MAXD"), the device 102 may infer that the received audio data and/or notification(s) corresponds to the same utterance 114, and may de-duplicate by deleting the audio data, and/or ignoring the notification so that two actions are not output based on a single utterance 114.

It is to be appreciated that the device arbitration at block 320 may be based on additional types of data, which may be considered in combination with the aforementioned "time-based data" that corresponds to the wakeword occurrence times. An example is "energy data", which may correspond to a signal strength value (e.g., SNR) associated with a detected utterance. Another example type of data that can be considered in the device arbitration logic of block 320 includes the aforementioned "contextual data" (e.g., a current state of the device(s) that detects an utterance, a last-used device, an ASR and/or NLU output, etc.).

When multiple types of data (e.g., time-based data and energy data) are used for device arbitration at block 320, the device 102 may utilize a scoring approach to designate a device, whereby a device assigned the highest score may be designated to perform an action with respect to user speech. Accordingly, the device 102 may receive one or more speech recognition events based on multiple speech interface devices detecting the same utterance. In the example of FIG. 3, the device 102 may detect the utterance (a first speech recognition event), and may receive a second speech recognition event from the remote system 352 in the form of the audio data 204 associated with the device 202. This speech recognition event (e.g., the received audio data 204) may include a second wakeword occurrence time, $W_{T2}$, (which constitutes time-based data), and may include an additional type(s) of data in the form of energy data, for example. This energy data may correspond to a second signal strength value (e.g., SNR) associated with audio data generated by the device 202 based on the utterance. The device 102 may then generate a first score for itself, and a second score for the device 202. The first score assigned to the device 102 may be based on the device's 102 time-based data (e.g., a first wakeword occurrence time, $W_{T1}$), and the device's 102 energy data (e.g., a first signal strength value (e.g., SNR) associated with audio data generated by, or received at, the device 102 based on the utterance). The second score assigned to the device 202 may be based on the speech interface device's 202 time-based data (e.g., a second wakeword occurrence time, $W_{T2}$), and the speech interface device's 202 energy data (e.g., a second signal strength value (e.g., SNR) associated with audio data generated by the speech interface device based on the utterance). In some embodiments, sub-scores can be computed for the time-based data and the energy data, the sub-scores can be translated to the same domain, and then the translated sub-scores can be used as a weighted average for computing a total "device score." In some embodiments, the time-based data may be used as fallback data when the energy data is unavailable or cannot be determined based on available data. In some embodiments, the time-based sub-scores and the energy sub-scores may be logged when they are not aligned (e.g., when a time-based sub-score for the device 102 is higher than the time-based sub-score for the device 202, yet the energy sub-score for the device 102 is lower than the energy sub-score for the device 202). This logged data may be used to further validate the outcome of the device arbitration determination at block 320, for tuning the scoring algorithms (e.g., weights), and/or for other purposes. It is to be appreciated that scores may be computed for devices whose audio data is deleted at block 322. For example, even if the device 102 determines to delete a "late" request that arrives before the second timeout lapses at block 322, the device 102 may nevertheless compute a device score (e.g., based on the time-based data and the energy data) and may log cases where a score associated with a device that was chosen, at block 320, to field the utterance is lower than a score associated with a device that sent audio data at a later point in time, and/or that detected the wakeword at a later point in time. In some embodiments, an arbitration determination can be corrected based on late-arriving data using a "retargeting" process, as described in more detail below with reference to FIG. 6.

The device 102 can compare the first score (device score assigned to the device 102) and the second score (device score assigned to the device 202), and designate the device associated with the highest score as the designated device to perform the action with respect to user speech at block 320. The audio data associated with the designated device can be processed locally, and audio data associated with devices that were not designated as the designated device can be deleted. Upon completion of local speech processing, directive data can be sent to, and/or processed by, the designated device, and the device 102 may inform other devices that were not designated as the designated device to refrain from performing an action with respect to the user speech. It is to be appreciated that additional types of data, such as the aforementioned contextual data, may be factored into the device score in a similar manner.

Figure 4:
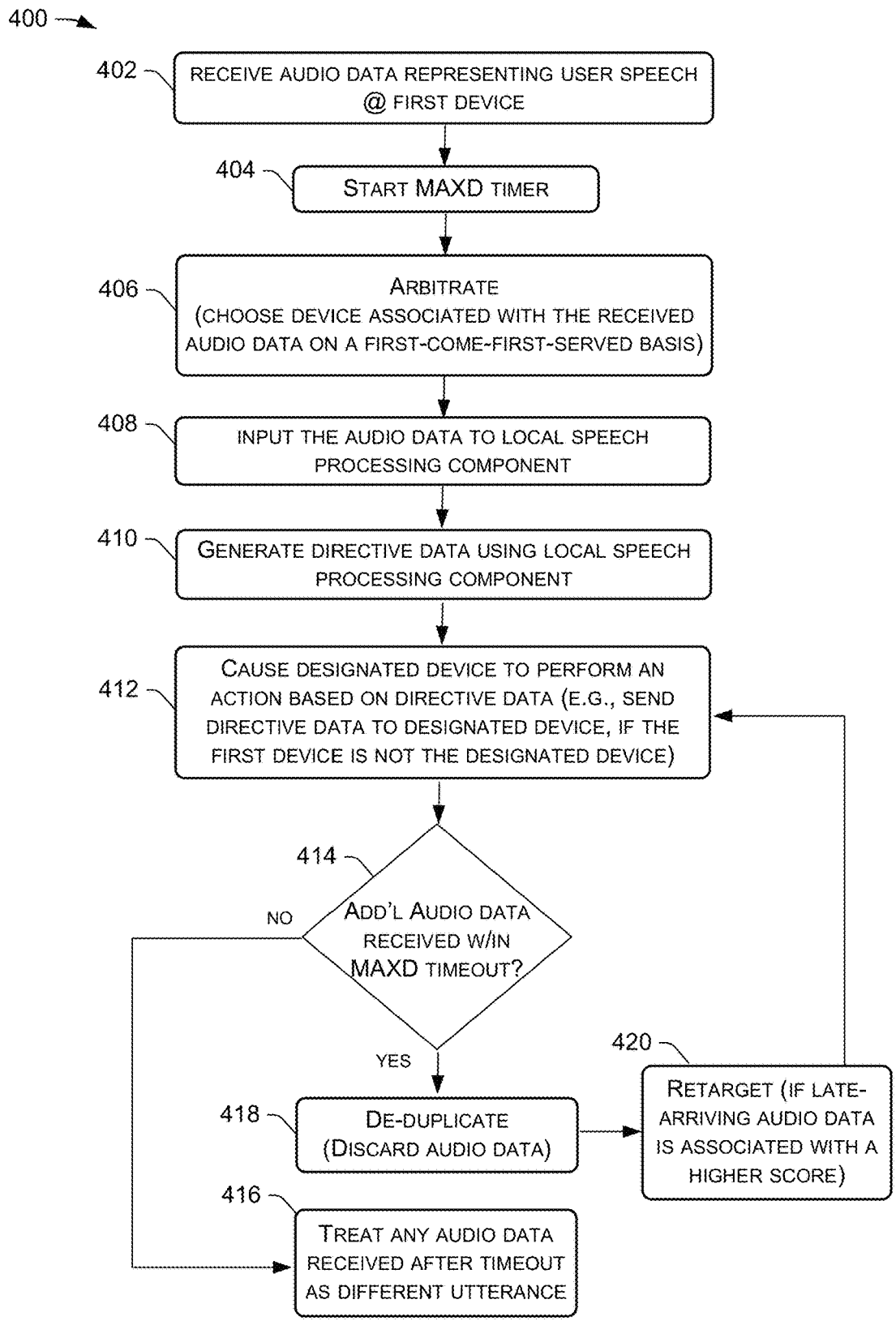
FIG. 4 is a flow diagram of an example process implemented by a device for using a first-come-first-served approach to device arbitration.

FIG. 4 is a flow diagram of an example process 400 implemented by a device 102 for using a first-come-first-served approach to device arbitration. This first-come-first-served approach to device arbitration may be suitable for use in environments with a single device 102, and one or more other non-device speech interface devices 202, or in a multi-device scenario where a single device can be designated as a "master" to process all requests, even from other devices in the environment, which act as "slaves"). For discussion purposes, the process 400 is described with reference to the previous figures.

At 402, a device 102 may receive, at a first time, first audio data that represents user speech. This first audio data may be audio data generated at the device 102 based on an utterance detected via a microphone(s) of the device 102. Alternatively, the first audio data may be audio data received from another device 202 that is collocated in the environment with the device 102.

At 404, the device 102 may start a timer for a timeout period (e.g., the second timeout period mentioned above, corresponding to a MAXD period of time). This MAXD timeout period may be referred to herein as a threshold time period that represents a maximum time (or time difference) expected between two speech interface devices detecting the same utterance.

At 406, the device 102 may perform device arbitration on a first-come-first-served basis. That is, the device 102 may designate whichever device is associated with the received first audio data as a designated device to perform an action with respect to the user speech. If the first audio data received at block 402 is audio data generated by the device 102 itself, then the device 102 may designate itself as the designated device to perform the action with respect to the user speech. If the first audio data received at block 402 was received wirelessly from another device 202, the device 202 that sent the first audio data may be designated as the designated device to perform the action with respect to the user speech. Notably, the device 102 may not wait for other audio data or notifications to arrive before designating the device at block 406. This is in contrast to the technique described with reference to FIGS. 1A and 2, where the device 102 may wait a period of time before performing device arbitration.

At 408, the device 102 may input the first audio data to a local speech processing component executing on the device 102. This local speech processing component may be configured to perform ASR on the first audio data, to perform NLU on the ASR text data to determine intent data, and to generate directive data based on the intent.

At 410, the device 102 may use the local speech processing component executing on the device 102 to generate directive data based at least in part on the first audio data. The directive data may be processed by the designated device to perform an action with respect to the user speech.

At 412, the device 102 may cause an action 121 to be performed based at least in part on the directive data generated at block 410. If the device 102 is the designated device chosen at block 406, a voice services client of the device 102 may process the directive data to perform the action 121 at the device 102. If a different device 202 is the designated device chosen at block 406, the device 102 may send the directive data (e.g., wirelessly) to that designated device 202, and a voice services client of the device 202 may process the directive data generated by the device 102 to perform the action. The action performed at block 412 can be any suitable action, such as outputting content (e.g., an audible response) via an output device of the designated speech interface device, sending a command to a second device, the command instructing an operation to be performed at the second device to control the second device (e.g., turn on a light, adjust a thermostat, etc.).

Meanwhile, at block 414, the device 102 may monitor for receipt of any additional audio data before the MAXD threshold time period expires. Although the decision block 414 is shown after block 412 in FIG. 4, it is to be appreciated that this monitoring at block 414 may be performed in the background at any time after block 404 (e.g., before, during, or after any of the preceding blocks 406-412).

If, at 414, the device 102 does not receive any additional audio data before a lapse of the threshold time period that corresponds to the MAXD time period, the process 400 may follow the "NO" route from block 414 to block 416 where the device 102 may treat any subsequently received audio data as a different utterance. For example, if additional audio data is received after the threshold time period lapses, the process 400 may iterate with respect to that new audio data. In this manner, different utterances may be fielded independently.

If, on the other hand, the device 102 receives additional audio data prior to a lapse of the threshold time period corresponding to MAXD, the process 400 may follow the "YES" route from block 414 to block 418 where the device 102 may de-duplicate requests by deleting the additional audio data. In some embodiments, the device 102 may compare the times of receipt of the additional audio data to a time of receipt of the first audio data at block 402, and if the difference between those times of receipt is less than the threshold time period corresponding to MAXD, the audio data associated with the later time of receipt is deleted. This is based on the notion that, if additional audio data is received in close temporal proximity to the first audio data received at block 402, it is more likely than not that the additional audio data corresponds to the same utterance, and this later-received audio data can be deleted. By deleting the audio data at block 418, a situation where duplicative actions 121 are performed for the same utterance is avoided. In some embodiments, the device 102 is configured to buffers any additional audio data that it receives, and then analyzes the time of receipt of the additional audio data to determine if the audio data is to be deleted or treated as a different utterance. It is possible that the device 102 may receive audio data from many devices in the environment (e.g., more than two devices) in instances where the user utters an expression near many speech interface devices. Additional audio data is treated the same in the process 400, regardless of the number of devices sending the audio data to the device 102; if the audio data arrives within the threshold time period, the audio data may be deleted.

In some embodiments, the devices that detect the utterance during the process 400 may report their wakeword occurrence times, $W_T$, to a remote system, whenever a connection with the remote system can be established. In this manner, the remote system can analyze the wakeword occurrence times, $W_T$, that it receives, and use those wakeword occurrence times to recalibrate the threshold period of time used by the device 102, for example, to determine whether to delete additional audio data or not.

In some embodiments, instead of automatically deleting later-received audio data at block 418, the device 102 may input the later-received audio data to the local speech processing component, and then decide which directive data to use based on the recognition result. For example, if the local speech processing component of the device 102 does not recognize an intent after processing the first audio data, and if the local speech processing component recognizes an intent based on processing additional audio data that is received after the first audio data, the device 102 may determine to use the recognized intent to generate directive data for performing an action, rather than outputting an apology message to the user, in this example. Starting and stopping speech recognition in this manner can be costly from a local-processing perspective, where compute resources are more limited than, say, a remote system with much more compute resources, this alternative approach may nevertheless improve accuracy of speech recognition if the best audio recording among multiple that are recorded for the same utterance is used to respond to user speech. In other words, the availability of multiple audio recordings for the same utterance can be leveraged by selecting the best one to process, at the expense of some added compute resource consumption, and possibly some added latency (if "better" audio data is received after the first audio data).

In some embodiments, a time "penalty" may be added to the device's 102 own utterance detection to account for the fact that locally-generated audio data does not have to be sent wirelessly to another device over a local area network. This time penalty added to the device's 102 utterance detection time may simulate a local area network latency, in some embodiments.

In some embodiments, the first audio data received at block 402 and/or additional audio data that is received at the device 102 after the first audio data may be associated with energy data in the form of a signal strength value(s) (e.g., SNR, in units of decibel (dB)), which may correspond to audio power of the audio data. This signal strength value may be utilized as an auxiliary data point (an additional type of data to that of the time-based data) in determining whether to delete the audio data that arrives at the device 102. This energy data (e.g., signal strength value(s)) can be used as a confirmation signal to inform the device 102 that it made the right arbitration decision, or the signal strength value can be assigned a weight and used along with the time data for the device arbitration operation at block 406, and/or the signal strength value can be used for retargeting the action to be performed at a different device, as shown at block 420. For example, at block 420, a scoring approach can be used to determine whether the designated device scores higher or lower as compared to a device associated with later-arriving audio data, and if the device associated with the later-arriving audio data scores higher than the designated device, the device 102 may retarget the action to be performed at the device associated with the higher score by, for example, sending the directive data to that higher-scoring device at block 412. This assumes that the late-arriving audio data is received before the performance of the action at block 412.

Figure 5:
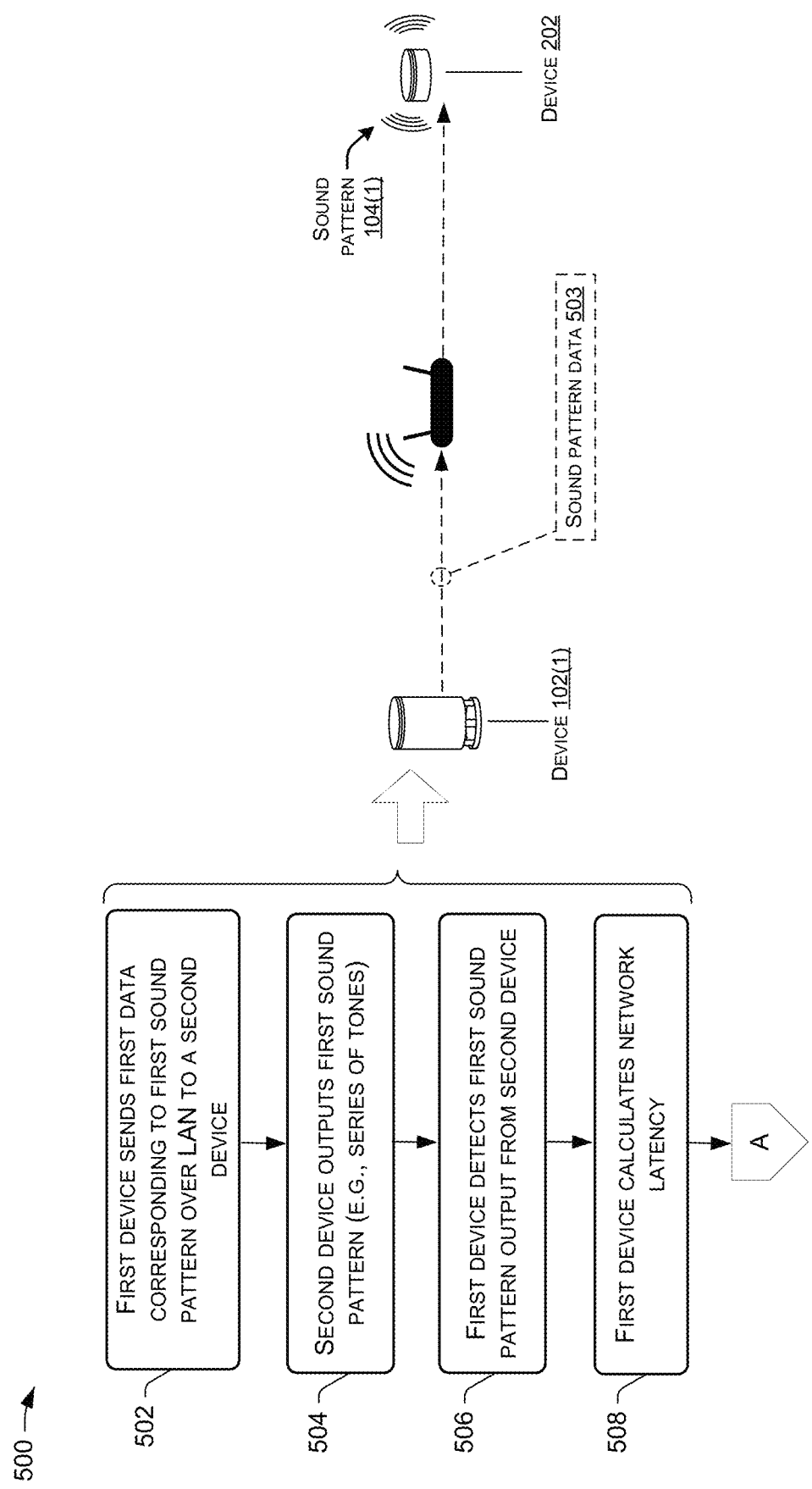
FIG. 5 is a flow diagram of an example process for using sound patterns to approximate a network latency value, which can be used by the device to synchronize the time outputs of different speech interface devices during device arbitration.

FIG. 5 is a flow diagram of an example process 500 for using sound patterns to approximate a network latency value, which can be used by the device to synchronize the time outputs of different speech interface devices during device arbitration. For discussion purposes, the process 500 is described with reference to the previous figures. Moreover, the process 500 may be augmentative to the technique described with reference to FIG. 1B, above. That is, in addition to determining the four time difference values, T1-T4, using the above-described sound pattern detection procedure, the process 500 can be used to add an extra variable, I, which is the network latency between speech interface devices. This creates a system of six equations, as described in more detail below.

At 502, a first device 102(1) may send, over a local area network to a device 202, first sound pattern data 503 corresponding to a first sound pattern 104(1). This first sound pattern 104(1) may represent the same first sound pattern 104(1) that is output from the first device 102(1) in the process 100 described with respect to FIG. 1B, above.

At 504, the device 202 may output, via a speaker(s) of the device 202, the first sound pattern 104(1) as a first series of tones.

At 506, the first device 102(1) may detect, via the microphone of the first device 102(1), at a capture time, the first series of tones output from the speaker(s) of the device 202.

At 508, the first device 102(1) may calculate, based at least in part on first timestamp data encoded in the first series of tones and the capture time, a network latency value, I, associated with the local area network.

As mentioned above, this creates a system of six equations, as follows:

$$\text{Master from first device } 102(1) \begin{cases} A + X = T1 & (9) \\ A + Y + D - I = T2 & (10) \\ B + Y = T3 & (11) \\ B + X + D + I = T4 & (12) \end{cases}$$

$$\text{Master from device } 202 \begin{cases} A + Y + D + I = T5 & (13) \\ B + X + D - I = T6 & (14) \end{cases}$$

Accordingly, beyond computing the parameters of Equations (7) and (8), as described above, the network latency value can be estimated with respect to two speech interface devices according to the following equation:

$$I = \frac{(T5 - T2)}{2} = \frac{(T4 - T6)}{2} \quad (15)$$

This network latency value, I, of Equation (15) can also be used to synchronize the time outputs of multiple speech interface devices in an environment. For example, when the first device 102(1) is performing device arbitration in real-time, the first device 102(1) can subtract the pre-calculated network latency value, I, from a time at which audio data is received at the first device 102(1) from the device 202, which results in the determination of an adjusted time of receipt that accounts for network latency. Thus, as shown by the off-page reference "A" in FIGS. 5 and 1A, this network latency value, I, can be applied to a time of receipt during the de-duplication operation at block 122 to account for network latency in determining whether to delete received audio data or not. That is, the first device 102(1) may detect an utterance at a first time, and then the first device 102(1) may receive audio data from a device 202 at a second time, and may apply the pre-calculated network latency value to the second time in order to obtain an adjusted second time. Then, the first device 102(1) can determine if the difference between the adjusted second time and the first time is less than a threshold time period (e.g., MAXD) to determine whether to delete the audio data from the device 202 or to treat the audio data as corresponding to a new utterance. The network latency value, I, can also be used to calibrate one or more of the timeout periods, such as the first timeout period corresponding to MIND, as described above.

Figure 6:
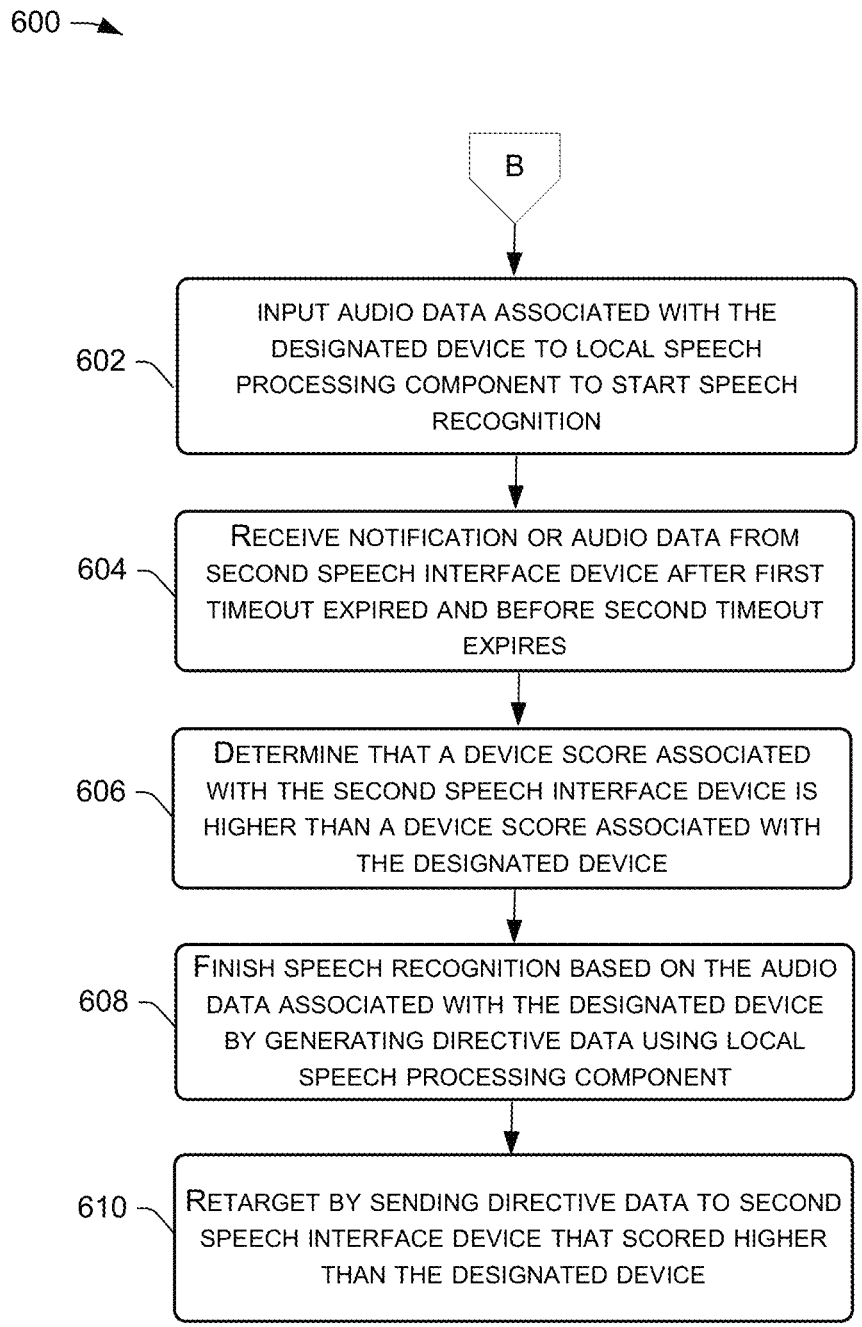
FIG. 6 is a flow diagram of an example process for retargeting an action so that the action is performed by a different speech interface device than the device that was initially designated during device arbitration.

FIG. 6 is a flow diagram of an example process 600 for retargeting an action so that the action is performed by a different speech interface device than the device that was initially designated during device arbitration. For discussion purposes, the process 600 is described with reference to the previous figures. Furthermore, as shown by the off-page reference "B" in FIGS. 1A, 2, and 6, the process 600 may continue from the process 100 or the process 200, after a device has been designated to perform an action with respect to user speech.

At 602, after designating a speech interface device as a designated device to perform an action with respect to the user speech (e.g., See block 120 or 220 of the process 100 or 200), the device 102 may input first audio data associated with the designated device to a local speech processing component executing on the device 102. This local speech processing component may be configured to perform ASR on the first audio data, to perform NLU on the ASR text data to determine intent data, and to generate directive data based on the intent.

At 604, after a lapse of the period of time corresponding to the first timeout (e.g., See block 118 or 218 of the process 100 or 200), and prior to a lapse of the threshold time period corresponding to the second timeout (e.g., block 122 or 222 of the process 100 or 200), the device 102 may receive a notification 119 or audio data 204 from another speech interface device in the environment.

At 606, the device 102 may utilize a scoring approach to calculate a first score associated with the designated device, and a second score associated with the other speech interface device whose notification 119 or audio data 204 was received at block 604. The scoring approach may be based on time-based data, energy-based data, and/or contextual data, as described herein. Generally, the device that detected the wakeword earlier and the device that is associated with a higher signal strength value may score higher than a device that detected the wakeword later and is associated with a lower signal strength value. However, a weighted scoring algorithm can be used to assign weights to these values (e.g., time-based data, energy data, etc.) and determine device scores accordingly, as described herein. Thus, at block 606, the device 102 may determine, based on the scores, that the second score associated with the other speech interface device is higher than the first score associated with the designated device (e.g., the device that was previously designated to field the utterance).

At 608, the device 102 may finish the speech recognition process by use the local speech processing component executing on the device 102 to generate directive data based at least in part on the first audio data. In other words, despite the other device 202 scoring higher than the designated device, the device 102 may continue speech recognition based on the earlier-received, first audio data associated with the designated device. Accordingly, the later-arriving audio data that was received at block 604 may be deleted (e.g., See block 122 or block 222 of the process 100 or 200) after determining the relative device scores at block 606.

At 610, the device 102 may retarget the action 121 to be performed based at least in part on the directive data generated at block 608 from the designated device to the other speech interface device associated with the higher score. That is, the audio data associated with the designated device may be used to perform an action at the other speech interface device that sent the notification 119 or audio data 204 after the first timeout expired and before the second timeout expired on the basis that the other speech interface device was assigned a higher score, and, hence, may be closer to the user, or may otherwise be a more appropriate device to perform the action. Thus, the retargeting at block 610 can include the device 102 performing an action that includes sending the directive data (e.g., wirelessly) to that other (retargeted) device 202, and a voice services client of that other device 202 may process the directive data generated by the device 102 to perform the action 121. The action performed by the other speech interface device can be any suitable action, such as outputting content (e.g., an audible response) via an output device of the designated speech interface device, sending a command to a second device, the command instructing an operation to be performed at the second device to control the second device (e.g., turn on a light, adjust a thermostat, etc.)

Figure 7:
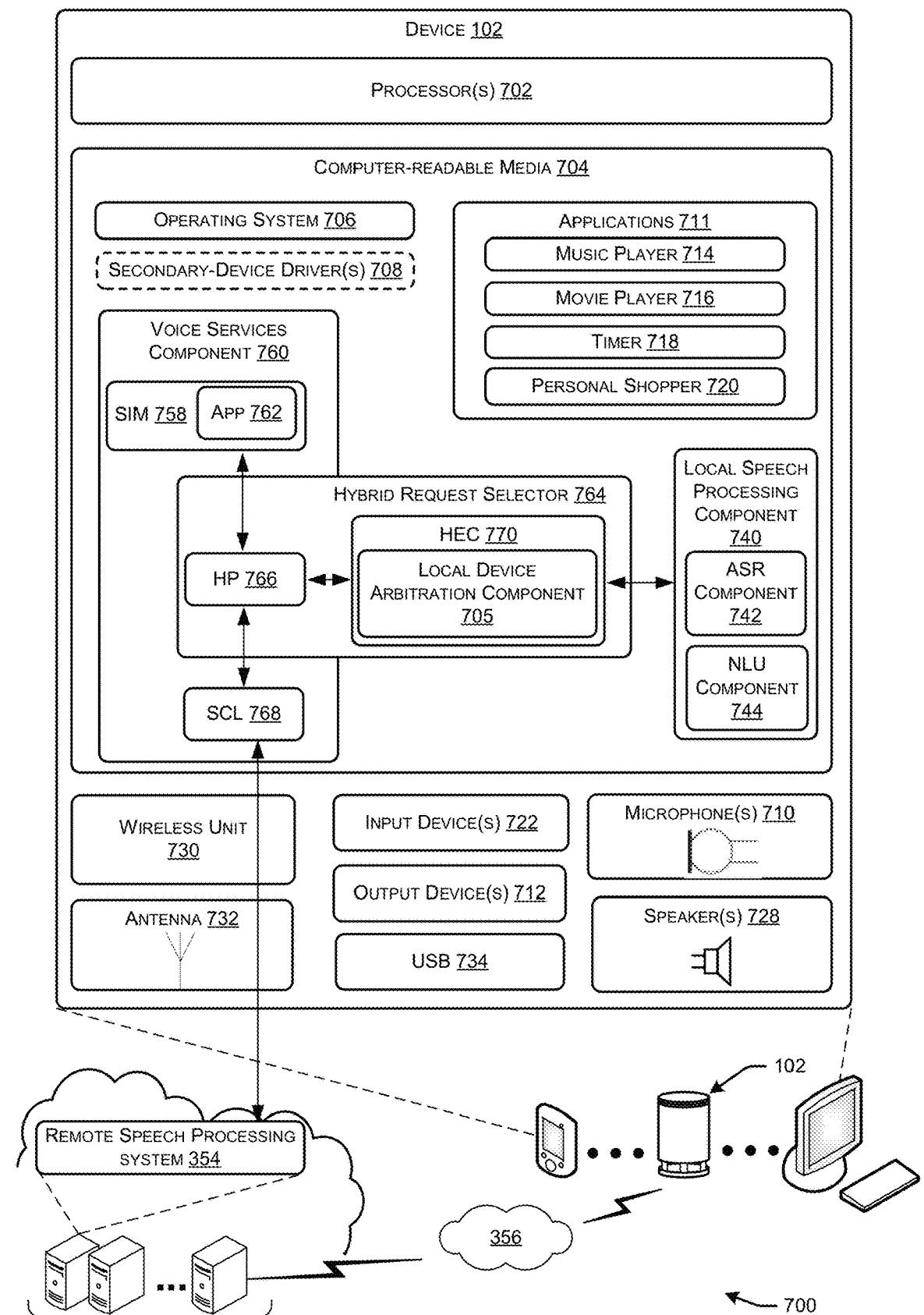
FIG. 7 is a block diagram illustrating a system including example components of an electronic device, such as the device configured to perform device arbitration, as described in the previous figures.

FIG. 7 is a block diagram illustrating a system 700 including example components of an electronic device, such as the device 102 described herein. The device 102 may be implemented as a standalone device that is relatively simple in terms of functional capabilities with limited input/output components, memory, and processing capabilities. For instance, the device 102 does not have a keyboard, keypad, or other form of mechanical input. Nor does it have a display (other than simple lights, for instance) or touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 102 is through voice input and audible output.

The device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the device 102 includes one or more processors 702 and computer-readable media 704. In some implementations, the processors(s) 702 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 702 may possess its own local memory, which also may store program modules, program data, and/or one or more operating systems.

The computer-readable media 704 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 704 may be implemented as computer-readable storage media ("CRSM"), which may be any available physical media accessible by the processor(s) 702 to execute instructions stored on the memory 704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 702.

Several modules such as instruction, datastores, and so forth may be stored within the computer-readable media 704 and configured to execute on the processor(s) 702. A few example functional modules are shown as applications stored in the computer-readable media 704 and executed on the processor(s) 702 to implement the functionality described herein, although the same functionality may alternatively be implemented in hardware, firmware, or as a system on a chip (SOC).

An operating system module 706 may be configured to manage hardware within and coupled to the device 102 for the benefit of other modules. In addition, in some instances the device 102 may include some or all of one or more secondary-device drivers 708. In other instances, meanwhile, the device 102 may be free from the drivers 708 for interacting with second devices. The device 102 may further include a local device arbitration component 705 that is configured to perform time-based local device arbitration procedures, as described herein, including the sound pattern detection procedure to calculate the various parameters described herein. The device 102 may further include a local speech processing component 740.

The local speech processing component 740 is configured to receive the audio data as input, to recognize speech in the audio data, to determine user intent from the recognized speech, and to determine how to act on the user intent by generating a directive (or directive data). In some cases, a directive may include a description of the intent (e.g., an intent to play jazz music). In some cases, a directive may include (e.g., encode) an identifier of a second device, and an operation to be performed at the second device.

In some embodiments, the device 102 may be configured to compare the audio data to stored models used to detect a wakeword that indicates to the device 102 that the audio data is to be processed for determining an intent. For example, the device 102 may convert audio into audio data, and process the audio data to determine whether speech is detected, and if so, if the audio data comprising speech matches an audio signature and/or model corresponding to a particular keyword. The device 102 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 102 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input. Once speech is detected in the audio received by the device 102 (or separately from speech detection), the device 102 may perform wakeword detection to determine when a user intends to speak a command to the device 102. This process may also be referred to as keyword detection, with the wakeword being a specific example of a keyword. Specifically, keyword detection may be performed without performing linguistic analysis, textual analysis or semantic analysis. Instead, incoming audio (or audio data) can be analyzed to determine if specific characteristics of the audio match preconfigured acoustic waveforms, audio signatures, or other data to determine if the incoming audio "matches" stored audio data corresponding to a keyword. Thus, wakeword detection may involve comparing audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding can be used to search the best path in the decoding graph, and the decoding output can be further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing can be applied for decision making. Other techniques for wakeword detection, such as those known in the art, may also be used.

In some embodiments, the device 102 can have hybrid capabilities to send audio data to a remote system 352 for speech processing using a remote speech processing system 354 while the local speech processing component 740 processes the audio data in parallel. Thus, the time-based local device arbitration techniques described herein may be implemented whenever the device 102 chooses to perform an action with respect to user speech with locally-generated directive data from the local speech processing component 740.

Among other logical and physical components, the local speech processing component 740 may include an automatic speech recognition (ASR) component 742 that is configured to perform ASR on the audio data to convert the audio data into ASR text data. ASR transcribes audio data into text data representing the words of the user speech contained in the audio data. A spoken utterance in the audio data can be input to the ASR component 742, which then interprets the utterance based on the similarity between the utterance and pre-established language models available to the local speech processing component 740. For example, the ASR component 742 may compare the input audio data with models for sounds (e.g., subword units or phonemes) and sequences of sounds to identify words that match the sequence of sounds spoken in the utterance of the audio data. In some embodiments, the ASR component 742 outputs the most likely text recognized in the audio data, or multiple hypotheses in the form of a lattice or an N-best list with individual hypotheses corresponding to confidence scores or other scores (such as probability scores, etc.). In some embodiments, the ASR component 742 is customized to the user 112 (or multiple users) who created a user account to which the device 102 is registered. For instance, the language models (and other data) used by the ASR component 742 may be based on known information (e.g., preferences) of the user 112, and/or on a history of previous interactions with the user 112.

The local speech processing component 740 may also include a natural language understanding (NLU) component 744 that performs NLU on the generated ASR text data to determine an intent so that directives may be determined based on the intent. Generally, the NLU component 744 takes textual input (e.g., from the ASR component 742) and attempts to make a semantic interpretation of the ASR text data. That is, the NLU component 744 determines the meaning behind the ASR text data based on the individual words, and then the NLU component 744 can implement that meaning. The NLU component 744 interprets a text string to derive an intent or a desired action or operation from the user 112. This may include deriving pertinent pieces of information in the text that allow the NLU component 744 to identifying a second device in the environment, if the user, for example, intends to control a second device (e.g., a light in the user's 112 house). For example, the ASR component 742 may outputs the ASR text "Play some jazz," and the NLU component 744 may determine that the user intended to play jazz music. The local speech processing component 740 may also provide a dialog management function to engage in speech dialogue with the user 112 to determine (e.g., clarify) user intents by asking the user 112 for information using speech prompts. In some embodiments, the NLU component 744 is customized to the user 112 (or multiple users) who created a user account to which the device 102 is registered. For instance, data used by the NLU component 744 to understand the meaning of ASR text may be based on known information (e.g., preferences) of the user 112, and/or on a history of previous interactions with the user 112.

The local speech processing component 740 may also include, or be configured to use, one or more installed speechlets. Speechlets may represent domains that are used in order to determine how to act on an utterance in a particular way, such as by outputting a directive that corresponds to the determined intent, and which can be processed to implement the desired operation. The speechlets installed on the device 102 may include, without limitation, a music speechlet (or music domain) to act an utterances with intents to play music on a device, such as via a speaker(s) of the device 102, a shopping speechlet (or shopping domain) to act on utterances with intents to buy an item from an electronic marketplace, and/or a device control speechlet (or device control domain) to act on utterances with intents to control a second device(s) in the environment.

It is to be appreciated that the local speech processing component 740 may be configured to generate, as output, directive data that can be processed by downstream components of the device 102 to cause performance of an action 121. In an example, directive data that is generated by a domain/speechlet of the local speech processing component 740 may be formatted using Java, such as JavaScript syntax, or JavaScript-based syntax. This may include formatting the directive using JavaScript Object Notation (JSON).

Under normal conditions, the device 102 may operate in conjunction with and/or under the control of the remote system 352, which can represent a remote, network-based or network-accessible control system. The remote system 352 may, in some instances be part of a network-accessible computing platform that is maintained and accessible via a wide area network 356. Network-accessible computing platforms such as this may be referred to using terms such as "on-demand computing", "software as a service (SaaS)", "platform computing", "network-accessible platform", "cloud services", "data centers", and so forth. The remote system 352 may be configured to provide particular functionality to large numbers of local (e.g., in-home, in-car, etc.) devices of different users.

In some embodiments, the remote system 352 may be configured to receive audio data from the device 102, to recognize speech in the received audio data using the remote speech processing system 354, and to perform functions in response to the recognized speech. In some embodiments, these functions involve sending directives, from the remote system 352, to the device 102 to cause the device 102 to perform an action, such as output an audible response to the user speech via a speaker(s) (i.e., an output device(s) 712), and/or control second devices in the environment by sending a control command via the wireless unit 730 and/or the antenna 732. Furthermore, the remote system 352 may perform device arbitration to designate a speech interface device in an environment to perform an action with respect to user speech. Thus, under normal conditions, when the device 102 is able to communicate with the remote system 352 over a wide area network 356 (e.g., the Internet), some or all of the functions capable of being performed by the remote system 352 may be performed by designating a device to field the utterance, and sending a directive(s) over the wide area network 356 to the designated device (e.g., the device 102), which, in turn, may process the directive(s), or send the directive(s) to the designated device (if the device 102 is not designated by the remote system 352), for performing an action(s). For example, the remote system 352 may instruct the device 102 to output an audible response (e.g., using text-to-speech (TTS)) to a user's question, to output content (e.g., music) via a speaker 728 of the device 102, and/or to turn on a light in the environment. It is to be appreciated that the remote system 352 may be configured to provide other functions in addition to those discussed herein, such as, without limitation, conducting an electronic commerce transaction on behalf of the user 112 as part of a shopping function, establishing a communication session between the user 112 and another user, and so on.

In some embodiments, connectivity may not be a binary condition in the sense that the devices in the environment either have connectivity to the remote system 352 or not. For example, some devices in the environment may lose connectivity to the remote system 352 while others remain connected. In this scenario, the device 102 may designated a first speech interface device to field an utterance, while the remote system 352 selects a second speech interface device to field the utterance. If the first speech interface device loses connectivity (e.g., goes offline), then the HEC 770 may attempt to send directive data to the first speech interface device, while the second speech interface device may receive directive data from the remote system 352 and may perform an action based on the remotely-generated directive data. In this scenario, the local device arbitration component 705 may notice the response from the remote system 352 that designates the second speech interface device to field the utterance, and use the availability of the remote response to invalidate its own arbitration decision that designated the first speech interface device to field the utterance. If, on the other hand, the second speech interface device loses connectivity (e.g., goes offline), then the HEC 770 may receive an "empty" response from the remote system 352, and, in response, may send locally-generated directive data to the first speech interface device, or redirect the locally-generated directive data (produced from audio data generated by the first speech interface device) to the second speech interface device.

The device 102 may also include a plurality of applications 711 stored in the computer-readable media 704 or otherwise accessible to the device 102. In this implementation, the applications 711 are a music player 714, a movie player 716, a timer 718, and a personal shopper 720. However, the device 102 may include any number or type of applications and is not limited to the specific examples shown here. The music player 714 may be configured to play songs or other audio files. The movie player 716 may be configured to play movies or other audio visual media. The timer 718 may be configured to provide the functions of a simple timing device and clock. The personal shopper 720 may be configured to assist a user in purchasing items from web-based merchants. When a remote system is unavailable to the device 102, these applications 711 may be configured to access local resources (e.g., local music or movie libraries, a local shopping list, a local calendar, etc.). In some cases, changes made to these local resources may be synched with remote versions of those resources when the remote system subsequently becomes available to the device 102.

In the example of FIG. 1A, FIG. 2, and FIG. 3, the user 112 is shown as uttering the expression "What time is it?" Whether this utterance is captured by the microphone(s) 710 of the device 102 or captured by another speech interface device in the environment, the audio data representing this user's speech is ultimately received by a speech interaction manager (SIM) 758 of a voice services component 760 executing on the device 102. The SIM 758 may manage received audio data by processing utterances as events, and the SIM 758 may also manage the processing of directives that are used to respond to the user speech (e.g., by controlling the action(s) of the device 102). The SIM 758 may include one or more client applications 762 or skills for performing various functions at the device 102.

A hybrid request selector 764 (or, hybrid request selector component 764) of the device 102 is shown as including a hybrid proxy (HP) 766 (or, hybrid proxy (HP) subcomponent 766), among other components. The HP 766 can be implemented as a layer within the voice services component 760 that is located between the SIM 758 and a speech communication library (SCL) 768, and may be configured to proxy traffic to/from the remote system 352. For example, the HP 766 may be configured to pass messages between the SIM 758 and the SCL 768 (such as by passing events and directives there between), and to send messages to/from a hybrid execution controller (HEC) 770 (or, hybrid execution controller (HEC) subcomponent 770). By "hooking into" the HP 766, the HEC 770 is given the ability to "snoop" on communication between the SIM 758 and the remote system 352 via the SCL 768. For instance, directive data received from the remote system 352 can be sent to the HEC 770 using the HP 766, which sits in the path between the SCL 768 and the SIM 758. The HP 766 may also be configured to allow audio data received from the SIM 758 to pass through to the remote speech processing system 354 (via the SCL 768) while receiving this audio data and sending the received audio data to the HEC 770.

The HEC 770 may act as a local endpoint, allowing other components to reach a local speech processing component 740 that is configured to process audio data representing user speech. In some embodiments, the HEC 770 is configured to handle different transports and protocols when messages and data are received from other devices in the environment by converging the received messages to a common protocol (e.g., using a protocol translator). The HEC 770 may further control the execution of the local speech processing component 740, such as by sending "execute" and "terminate" events/instructions to the local speech processing component 740. An "execute" event may instruct the local speech processing component 740 to continue its execution based on audio data (e.g., by instructing the local speech processing component 740 to execute on a previously-determined intent in order to generate a directive). Meanwhile, a "terminate" event may instruct the local speech processing component 740 to terminate further execution based on the audio data, such as when the device 102 receives directive data from the remote system 352 and chooses to use that remotely-generated directive data.

As shown in FIG. 7, the local device arbitration component 705 may be implemented as a subcomponent of the HEC 770. As such, the HEC 770 can implement device arbitration logic, as described herein, to determine a most appropriate speech interface device to perform an action with respect to the user speech. In an illustrative example, where the user 112 utters the wakeword followed by the expression "What time is it?", audio data corresponding to the utterance is received by the SIM 758 of the voice services component 760. Assuming the device 102 is one of multiple devices that detected the utterance, the audio data may correspond to audio data that was generated by the device 102, and the SIM 758 may send the audio data through the HP 766 of the hybrid request selector 764, which allows the audio data to pass through to the SCL 768, and the SCL 768, in turn, sends the audio data over the wide area network 356 to the remote system 352 for processing speech remotely. The wide area network 356 is representative of any type of public or private, wide-area network, such as the Internet, which extends beyond the environment of the device 102. Thus, the wide area network 356 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The HP 766 may also receive the audio data and send the received audio data to the HEC 770. Assuming the device 102 detected the utterance, the audio data may correspond to audio data that was generated by the device 102. Assuming another speech interface device(s) in the environment also detected the utterance, the HP 766 may receive additional speech recognition events from those other devices. In the case of non-hybrid speech interface devices, these speech recognition events may be received with the audio data 204 generated by the non-hybrid speech interface device(s). In the case of an additional device with hybrid capabilities, the speech recognition event may be received as a notification 119(2).

With multiple speech recognition events in-hand, the local device arbitration component 705 of the HEC 770 may implement the time-based local device arbitration techniques described herein to designate a speech interface device (e.g., the device 102, or another speech interface device in the environment) as a designated device to perform an action with respect to the user speech. Depending on which device is designated to perform the action with respect to the user speech, the audio data generated by that designated device may be input to the local speech processing component 740 for determining an intent and generating directive data. Alternatively, in the case where another device is designated to field the utterance, the device 102 may refrain from processing speech locally, and may allow the other device to do so using its own local speech processing component.

The hybrid request selector 764 may be configured to wait for a response from either or both of the remote system 352 or the local speech processing component 740. Depending on the availability of the remote system 352, a response from the remote system 352 may or may not be received, and the timing of the receipt of such a response may vary (e.g., a response from the remote system 352 may be received before or after a response from the local speech processing component 740). In any scenario, the HEC 770 of the hybrid request selector 764 is configured to determine whether to respond to the user speech with directive data generated by the local speech processing component 740, or, if a response from the remote system 352 is received, whether to respond to the user speech with second directive data received from the remote system 352. When a response (second data) from the remote system 352 is received by the SCL 768 for example, the HP 766 may send this second data, including remotely-generated directive data, to the HEC 770. The HEC 770 can then implement selection logic to choose which response to utilize in responding to the user speech. If the HEC 770 determines to respond to the user speech with directive data generated by the local speech processing component 740, the local speech processing component 740 can generate directive data and send it to the HEC 770, whereby the locally-generated directive data can be sent to the SIM 758 via the HP 766 for causing performance of the action by the designated device.

In some embodiments, the device 102 may discover other devices in the environment, and may implement secure, authenticated communication with the discovered devices, such as by bootstrapping a secure sockets layer (SSL) connection. In an example, the HEC 770 may generate a self-signed certificate(s), and may request the operating system 706 (e.g., a Java Wrapper of the operating system 706) to advertise a service. This service advertisement may utilize any suitable protocol and/or framework, such as the Discovery-and-Launch (DIAL) protocol and/or Whisperplay framework for device discovery. Another speech interface device that is connected to a common network (e.g., subnet, local area network, etc.) as the device 102 may (via its own hybrid proxy component) generate a self-signed certificate(s) and may attempt to discover any advertised services. Upon discovering the service advertised by the device 102, the other speech interface device may perform an authentication procedure with the device 102, whereby the self-signed certificates (and metadata) are exchanged, and a SSL is established between the device 102 and the other speech interface device upon certificate verification. In some embodiments, the device 102 may implement the DIAL protocol to discover and establish a secure, authenticated communication channel with a second speech interface device in the same environment. In some embodiments, this discovery and communication may be accomplished by registering applications executing on the devices (e.g., applications executing on the device 102) with a DIAL registry, and may these applications may be configured to handle DIAL launch intent payloads (information that can be passed between applications via a DIAL launch request). In some embodiments, a manifest of the operating system 706 may be modified to support Whisperplay and DIAL, and a Whisperplay.xml file may be added to resources of application(s) in the res/xml/directory for purposes of local device discovery.

Generally, the device 102 has input devices 722 and output devices 712. The input devices 722 may include, without limitation, a keyboard, keypad, mouse, touch screen, joystick, control buttons, etc. In some implementations, one or more microphones 710 may function as input devices 722 to receive audio input, such as user voice input. The output device(s) 712 may include, without limitation, a display(s), a light element (e.g., LED), a vibrator to create haptic sensations, or the like. In some implementations, one or more speakers 728 may function as output devices 712 to output audio sounds (e.g., audio content, TTS responses, tones at various frequencies, etc.).

A user 112 may interact with the device 102 by speaking to it, and the one or more microphone(s) 710 captures the user's speech. The device 102 can communicate back to the user 112 by emitting audible statements through the speaker 728. In this manner, the user 112 can interact with the device 102 solely through speech, without use of a keyboard or display.

The device 102 may further include a wireless unit 730 coupled to an antenna 732 to facilitate a wireless connection to a network. The wireless unit 730 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over a wide area network. As such, the device 102 may be configure to act as a device that can communicate with second devices in the environment and control the second devices, such as by using protocol stacks, drivers, and adapters to communicate over a suitable communications protocol. A USB port 734 may further be provided as part of the device 102 to facilitate a wired connection to a network, or a plug-in network device that communicates with other wireless networks. In addition to the USB port 734, or as an alternative thereto, other forms of wired connections may be employed, such as a broadband connection, Transmission Control Protocol/Internet Protocol (TCP/IP) protocol connection, etc.

Accordingly, when implemented as the primarily-voice-operated speech interface device, there may be no input devices, such as navigation buttons, keypads, joysticks, keyboards, touch screens, and the like other than the microphone(s) 710. Further, there may be no output such as a display for text or graphical output. The speaker(s) 728 may be the main output device. In one implementation, the device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 102 may be implemented as an aesthetically appealing device with smooth and rounded surfaces, with one or more apertures for passage of sound waves. The device 102 may merely have a power cord and optionally a wired interface (e.g., broadband, USB, etc.). As a result, the device 102 may be generally produced at a low cost. Once plugged in, the device 102 may automatically self-configure, or with slight aid of the user, and be ready to use. In other implementations, other I/O components may be added to this basic model, such as specialty buttons, a keypad, display, and the like.

Figure 8:
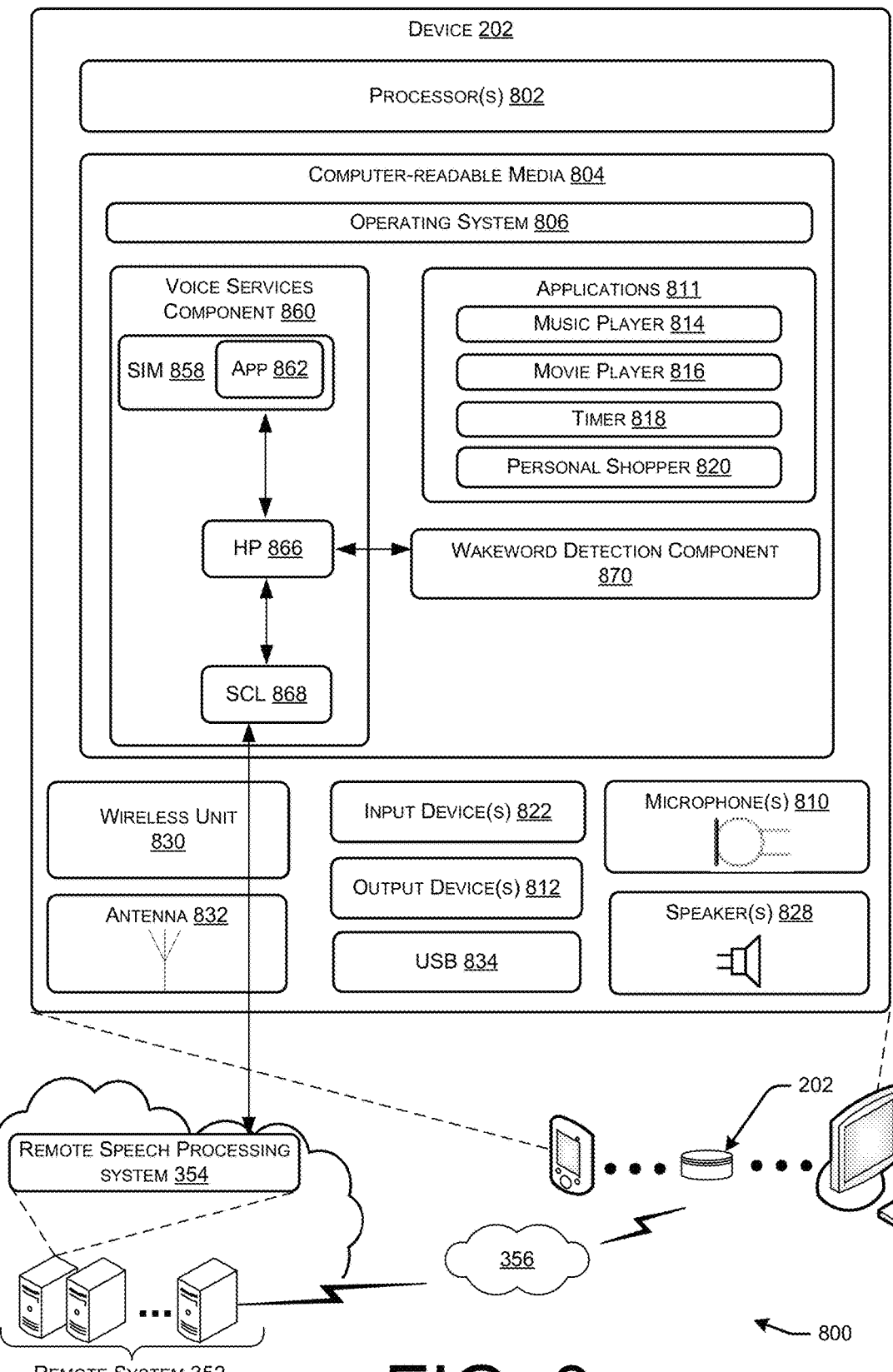
FIG. 8 is a block diagram illustrating a system including example components of an electronic device, such as the device collocated in an environment with the device configured to perform device arbitration.

FIG. 8 is a block diagram illustrating a system 800 including example components of an electronic device, such as the device 202 described herein, which may be collocated in an environment with the device 102 configured to perform device arbitration. The device 202 may represent a "non-hybrid" speech interface device that does not have the same local speech processing capabilities of a hybrid speech interface device, such as the device 102. Hence, the device 202 may rely on the other, hybrid device 102 for speech processing when, for example, the remote system 352 is unavailable or otherwise slow to respond.

The device 202 may be implemented as a standalone device that is relatively simple in terms of functional capabilities with limited input/output components, memory, and processing capabilities. For instance, the device 202 does not have a keyboard, keypad, or other form of mechanical input. Nor does it have a display (other than simple lights, for instance) or touch screen to facilitate visual presentation and user touch input. Instead, the device 202 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 202 is through voice input and audible output.

The device 202 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the device 202 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the device 202 includes one or more processors 802 and computer-readable media 804. In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store program modules, program data, and/or one or more operating systems.

The computer-readable media 804 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 804 may be implemented as computer-readable storage media ("CRSM"), which may be any available physical media accessible by the processor(s) 802 to execute instructions stored on the memory 804. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 802.

Several modules such as instruction, datastores, and so forth may be stored within the computer-readable media 804 and configured to execute on the processor(s) 802. A few example functional modules are shown as applications stored in the computer-readable media 804 and executed on the processor(s) 802 to implement the functionality described herein, although the same functionality may alternatively be implemented in hardware, firmware, or as a system on a chip (SOC).

An operating system module 806 may be configured to manage hardware within and coupled to the device 202 for the benefit of other modules. The device 202 may be configured to perform the sound pattern detection procedure to calculate the various parameters described herein.

Under normal conditions, the device 202 may operate in conjunction with and/or under the control of the remote system 352, which can represent a remote, network-based or network-accessible control system. The remote system 352 may, in some instances be part of a network-accessible computing platform that is maintained and accessible via a wide area network 356. Network-accessible computing platforms such as this may be referred to using terms such as "on-demand computing", "software as a service (SaaS)", "platform computing", "network-accessible platform", "cloud services", "data centers", and so forth. The remote system 352 may be configured to provide particular functionality to large numbers of local (e.g., in-home, in-car, etc.) devices of different users.

In some embodiments, the remote system 352 may be configured to receive audio data from the device 202, to recognize speech in the received audio data using the remote speech processing system 354, and to perform functions in response to the recognized speech. In some embodiments, these functions involve sending directives, from the remote system 352, to the device 202 to cause the device 202 to perform an action, such as output an audible response to the user speech via a speaker(s) (i.e., an output device(s) 812). Furthermore, the remote system 352 may perform device arbitration to designate a speech interface device in an environment to perform an action with respect to user speech. Thus, under normal conditions, when the device 202 is able to communicate with the remote system 352 over a wide area network 356 (e.g., the Internet), some or all of the functions capable of being performed by the remote system 352 may be performed by designating a device to field the utterance, and sending a directive(s) over the wide area network 356 to the designated device (e.g., the device 202), which, in turn, may process the directive(s) for performing an action(s). For example, the remote system 352 may instruct the device 202 to output an audible response (e.g., using text-to-speech (TTS)) to a user's question, to output content (e.g., music) via a speaker 828 of the device 202. It is to be appreciated that the remote system 352 may be configured to provide other functions in addition to those discussed herein, such as, without limitation, conducting an electronic commerce transaction on behalf of the user 112 as part of a shopping function, establishing a communication session between the user 112 and another user, and so on.

The device 202 may also include a plurality of applications 811 stored in the computer-readable media 804 or otherwise accessible to the device 202. The applications 811 may include, without limitation, a music player 814, a movie player 816, a timer 818, and a personal shopper 820. When a remote system is unavailable to the device 202, these applications 811 may be configured to access local resources (e.g., local music or movie libraries, a local shopping list, a local calendar, etc.). In some cases, changes made to these local resources may be synched with remote versions of those resources when the remote system subsequently becomes available to the device 202.

In an example, the device 202 may generate audio data by detecting an utterance 114 via a microphone(s) 810 of the device 202. This audio data representing this user's speech is ultimately received by a speech interaction manager (SIM) 858 of a voice services component 860 executing on the device 202. The SIM 858 may manage received audio data by processing utterances as events, and the SIM 858 may also manage the processing of directives that are used to respond to the user speech (e.g., by controlling the action(s) of the device 202). The SIM 858 may include one or more client applications 862 or skills for performing various functions at the device 202.

The device 202 may further include a hybrid proxy (HP) 866 (or, hybrid proxy (HP) component 866), among other components. The HP 866 can be implemented as a layer within the voice services component 860 that is located between the SIM 858 and a speech communication library (SCL) 868, and may be configured to proxy traffic to/from the remote system 352. For example, the HP 866 may be configured to pass messages between the SIM 858 and the SCL 868 (such as by passing events and directives there between), and to send messages to/from other hybrid proxy components of other speech interface devices (e.g., the device 102) in the environment. In this manner, when the remote system 352 is available, the HP 866 may receive directive data from the remote system 352 via the SCL 868 to perform an action. However, in scenarios where the remote system 352 is unavailable or otherwise slow to respond, the device 202 can send audio data generated by the device 202 to another device (e.g., the device 102) in the environment via the HP 866 so that the local speech processing component 740 of the other device 102 can process the audio data and/or so that a device arbitration decision can be made by the other device 102.

As mentioned, the device 202 may be configured with limited speech processing functionality as compared to a "hybrid" device, like the device 102 with the local speech processing component 740. Accordingly, the device 202 may include a wakeword detection component 870 that processes audio data to determine if a wakeword is detected in the audio. The wakeword detection component 870 may process audio data to determine if an audio signature and/or model corresponding to a particular keyword is identified in the audio data. If a wakeword is detected, the audio data can be sent to a speech processing system, such as the remote speech processing system 354 and/or a local speech processing component 740 of another device 102 in the environment.

Generally, the device 202 has input devices 822 and output devices 812. The input devices 822 may include, without limitation, a keyboard, keypad, mouse, touch screen, joystick, control buttons, etc. In some implementations, one or more microphones 810 may function as input devices 822 to receive audio input, such as user voice input. The output device(s) 812 may include, without limitation, a display(s), a light element (e.g., LED), a vibrator to create haptic sensations, or the like. In some implementations, one or more speakers 828 may function as output devices 812 to output audio sounds (e.g., audio content, TTS responses, tones at various frequencies, etc.).

A user 112 may interact with the device 202 by speaking to it, and the one or more microphone(s) 810 captures the user's speech. The device 202 can communicate back to the user 112 by emitting audible statements through the speaker 828. In this manner, the user 112 can interact with the device 202 solely through speech, without use of a keyboard or display.

The device 202 may further include a wireless unit 830 coupled to an antenna 832 to facilitate a wireless connection to a network. The wireless unit 830 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over a wide area network. A USB port 834 may further be provided as part of the device 202 to facilitate a wired connection to a network, or a plug-in network device that communicates with other wireless networks. In addition to the USB port 834, or as an alternative thereto, other forms of wired connections may be employed, such as a broadband connection, Transmission Control Protocol/Internet Protocol (TCP/IP) protocol connection, etc.

Accordingly, when implemented as the primarily-voice-operated speech interface device, there may be no input devices, such as navigation buttons, keypads, joysticks, keyboards, touch screens, and the like other than the microphone(s) 810. Further, there may be no output such as a display for text or graphical output. The speaker(s) 828 may be the main output device. In one implementation, the device 202 may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 202 may be implemented as an aesthetically appealing device with smooth and rounded surfaces, with one or more apertures for passage of sound waves. The device 202 may merely have a power cord and optionally a wired interface (e.g., broadband, USB, etc.). As a result, the device 202 may be generally produced at a low cost. Once plugged in, the device 202 may automatically self-configure, or with slight aid of the user, and be ready to use. In other implementations, other I/O components may be added to this basic model, such as specialty buttons, a keypad, display, and the like.

Figure 9:
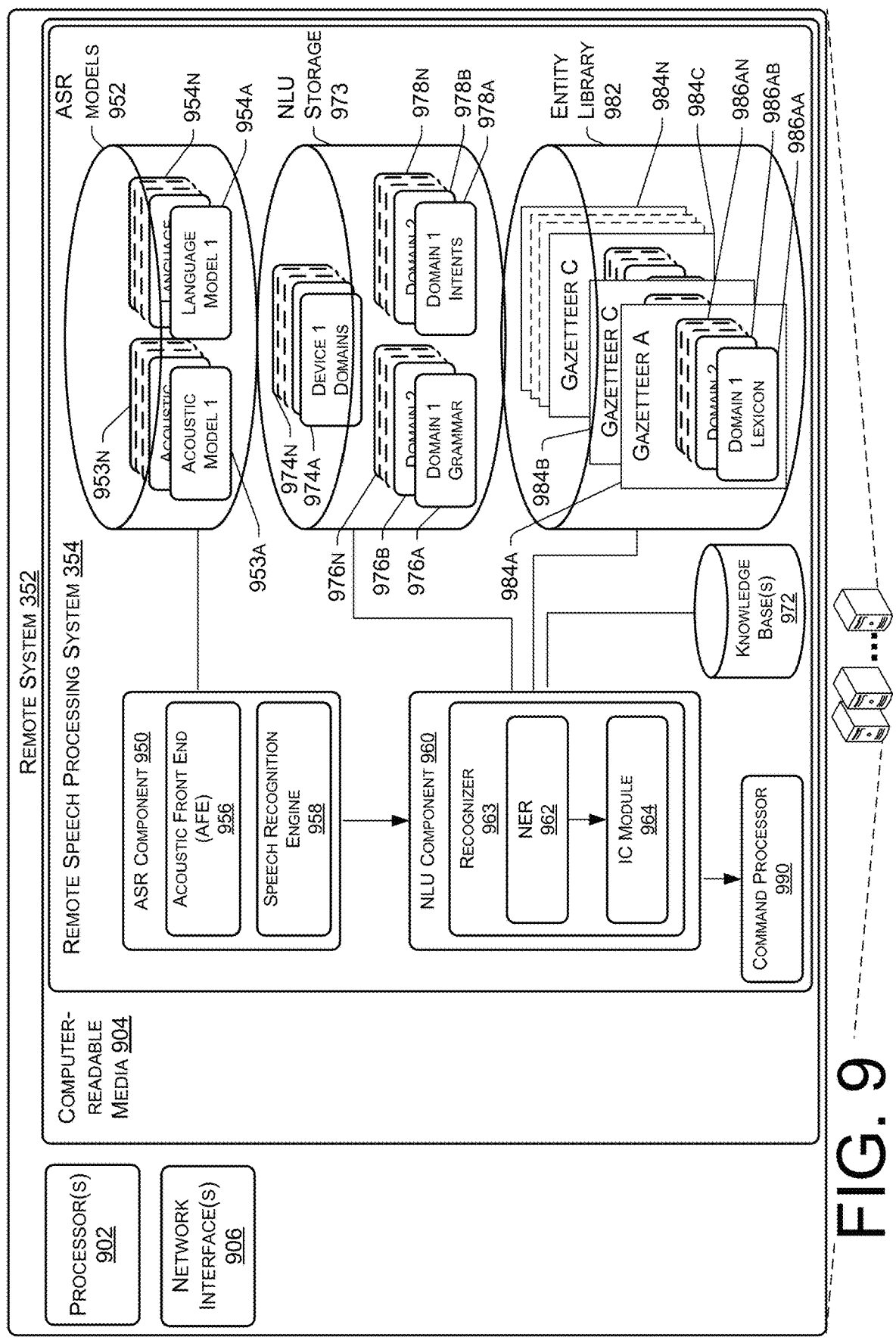
FIG. 9 is a block diagram illustrating a remote system including example components of a remote speech processing system.

FIG. 9 is a block diagram illustrating a remote system 352 including example components of a remote speech processing system 354. In the illustrated implementation, the remote system 352 includes one or more processors 902 and computer-readable media 904. In some implementations, the processors(s) 902 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 902 may possess its own local memory, which also may store program modules, program data, and/or one or more operating systems.

The computer-readable media 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 904 may be implemented as computer-readable storage media ("CRSM"), which may be any available physical media accessible by the processor(s) 902 to execute instructions stored on the memory 904. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 902.

The remote system 352 may also include one or more network interfaces 906. The network interface(s) 906 such as a wireless or Wi-Fi network communications interface, an Ethernet communications interface, a cellular network communications interface, a Bluetooth communications interface, etc., for communications by the remote system 352 over various types of networks, including wide-area network, local-area networks, private networks, public networks etc.

The computer-readable media 904 may include, among other components, the remote speech processing system 354, as described herein. Audio data may be received from devices (e.g., the devices 102, 202, etc.) and may be provided as input to the remote speech processing system 354 for speech processing. Speech processing may be implemented to interpret speech (e.g., for purposes of enabling voice-communications and/or for purposes of executing a command in the speech). The audio data received by the remote speech processing system 354 may include data corresponding to the wakeword, or the portion of the audio data corresponding to the wakeword may be removed by the local device 102/202 prior to sending. Upon receipt by the remote system 352, an ASR component 950 may convert the received audio data into text. The ASR transcribes audio data into text data representing the words of the speech contained in the audio data. The text data may then be used by other components for various purposes, such as executing system commands, inputting data, etc. A spoken utterance in the audio data can be input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (e.g., the different hypotheses) may individually be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word which matches the sounds would be included in the sentence at the specific location (e.g., using a language or grammar model). Thus individual potential textual interpretations of the spoken utterance (hypothesis) can be associated with corresponding confidence scores. Based on the considered factors and the assigned confidence score, the ASR component 950 outputs the most likely text recognized in the audio data. The ASR component 950 may also output multiple hypotheses in the form of a lattice or an N-best list with individual hypotheses corresponding to confidence scores or other scores (such as probability scores, etc.).

The ASR component 950 may include an acoustic front end (AFE) 956 and a speech recognition engine 958. The acoustic front end (AFE) 956 transforms the audio data received from the local device 102/202 into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing a time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 956 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, a local device 102/202 may process audio data into feature vectors (for example using an on-device AFE) and transmit that information to a server across a network for ASR processing. Feature vectors may arrive at the remote system 352 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information can be used to calculate an acoustic score representing a likelihood that the intended sound represented by a group of feature vectors matches a language phoneme. The language information can be used to adjust the acoustic score by considering what sounds and/or words are used in context with each other, thereby improving the likelihood that the ASR component 950 will output speech results that make sense grammatically. The specific models used may be general models or may be models corresponding to a particular domain, such as music, banking, etc.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across a network(s). For example, ASR results in the form of a single textual representation of the speech, an N-best list including multiple hypotheses and respective scores, lattice, etc. may be sent to the remote system 352, for natural language understanding (NLU) processing, such as conversion of the text into commands for execution, either by the device 102/202, by the remote system 352, or by another device (such as a server running a specific application like a search engine, etc.).

An NLU component 960 may include various components, including potentially dedicated processor(s), memory, storage, etc. As shown in FIG. 9, an NLU component 960 may include a recognizer 963 that may include a named entity recognition (NER) module 962 which can be used to identify portions of query text that correspond to a named entity that may be recognizable by the system. A downstream process called named entity resolution actually links a text portion to an actual specific entity known to the system. To perform named entity resolution, the system may utilize gazetteer information (984a-984n) stored in entity library storage 982. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 960 takes textual input (such as processed from ASR component 950 based on the utterance input audio) and attempts to make a semantic interpretation of the text. That is, the NLU component 960 determines the meaning behind the text based on the individual words and then implements that meaning. NLU component 960 interprets a text string to derive an intent or a desired action from the user as well as the pertinent pieces of information in the text that allow a device (e.g., device 102/202) to complete that action. For example, if a spoken utterance is processed using ASR and outputs the text "play Joe Songbird Everywhere" the NLU component 960 may determine that the user intended to have a group of devices (e.g., devices 102 and 202) that are members of a group named "Everywhere" output audio of music by the artist "Joe Songbird" in a synchronized manner.

The NLU component 960 may process several textual inputs related to the same utterance. For example, if the ASR component 950 outputs N text segments (as part of an N-best list), the NLU component 960 may process all N outputs to obtain NLU results.

As will be discussed further below, the NLU component 960 may be configured to parsed and tagged to annotate text as part of NLU processing. For example, for the text "Play Joe Songbird Everywhere," "play" may be tagged as a command (to output audio of an audio file) and "Joe Songbird" and "Everywhere" may be tagged as a specific entities associated with the command. Further, the NLU component 960 may be used to provide answer data in response to queries, for example using the knowledge base 972. For instance, the knowledge base 972 may be used to provide TTS responses via a local device 102/202 as audio output to the user 112 in response to queries like "what's the weather like today?"

To correctly perform NLU processing of speech input, the NLU component 960 may be configured to determine a "domain" of the utterance so as to determine and narrow down which services offered by the endpoint device (e.g., remote system 352 or device 102/202) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 962 receives a query in the form of ASR results and attempts to identify relevant grammars and lexical information that may be used to construe meaning. To do so, the NLU component 960 may begin by identifying potential domains that may relate to the received query. The NLU storage 973 may include a databases of devices (974a-974n) identifying domains associated with specific devices. For example, a local device 102/202 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping", "music", "calendaring", etc. As such, individual domains may be associated with particular recognizers 963, language models and/or grammar databases (976a-976n), particular sets of intents/actions (978a-978n), and particular personalized lexicons (986). An individual gazetteer (984a-984n) may include domain-indexed lexical information associated with a particular user and/or device. For example, the Gazetteer A (984a) may include domain-index lexical information 986aa to 986an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to individual identified domains. For example, if a query potentially implicates both communications and music, the query may, substantially in parallel, be NLU processed using the grammar models and lexical information for communications, and will be processed using the grammar models and lexical information for music. The responses based on the query produced by individual sets of models can be scored, with the overall highest ranked result from all applied domains is ordinarily selected to be the correct result.

An intent classification (IC) module 964 parses the query to determine an intent or intents for individual identified domains, where the intent corresponds to the action to be performed that is responsive to the query. An individual domain can be associated with a database (978a-978n) of words linked to intents. For example, a music intent database may link words and phrases such as "quiet," "volume off," and "mute" to a "mute" intent. The IC module 964 identifies potential intents for individual identified domains by comparing words in the query to the words and phrases in the intents database 978. Traditionally, the determination of an intent by the IC module 964 is performed using a set of rules or templates that are processed against the incoming text to identify a matching intent.

In order to generate a particular interpreted response, the NER 962 applies the grammar models and lexical information associated with the respective domain to actually recognize a mention one or more entities in the text of the query. In this manner the NER 962 identifies "slots" (e.g., particular words in query text) that may be needed for later command processing. Depending on the complexity of the NER 962, it may also label each slot with a type of varying levels of specificity (such as noun, place, city, artist name, song name, or the like). An individual grammar model 976 may include the names of entities (i.e., nouns) commonly found in speech about the particular domain (i.e., generic terms), whereas the lexical information 986 from the gazetteer 984 can be personalized to the user(s) and/or the device. For instance, a grammar model associated with the shopping domain may include a database of words commonly used when people discuss shopping.

The intents identified by the IC module 964 are linked to domain-specific grammar frameworks (included in 976) with "slots" or "fields" to be filled. Each slot/ field corresponds to a portion of the query text that the system believes corresponds to an entity. For example, if "play music" is an identified intent, a grammar (976) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 962 may parse the query to identify words as subject, object, verb, preposition, etc., based on grammar rules and/or models, prior to recognizing named entities. The identified verb may be used by the IC module 964 to identify intent, which can then be used by the NER module 962 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play Song 1 by the Joe Songbird" might be parsed and tagged as {Verb}: "Play," {Object}: "Song 1," {Object Preposition}: "by," and {Object Modifier}: "Joe Songbird." At this point in the process, "Play" is identified as a verb based on a word database associated with the music domain, which the IC module 964 will determine corresponds to the "play music" intent. At this stage, no determination has been made as to the meaning of "Song 1" and "Joe Songbird," but based on grammar rules and models, it can be determined that the text of these phrases relate to the grammatical object (e.g., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 962 may search the database of generic words associated with the domain (in the knowledge base 972). So for instance, if the query was "play songs by Joe Songbird," after failing to determine an album name or song name called "songs" by "Joe Songbird," the NER component 962 may search the domain vocabulary for the word "songs." In the alternative, generic words may be checked before the gazetteer information, or both may be tried, potentially producing two different results.

The results of NLU processing may be tagged to attribute meaning to the query. So, for instance, "play Song 1 by Joe Songbird" might produce a result of: {domain} Music, {intent} Play Music, {artist name} "Joe Songbird," {media type} SONG, and {song title} "Song 1." As another example, "play songs by Joe Songbird" might produce: {domain} Music, {intent} Play Music, {artist name} "Joe Songbird," and {media type} SONG.

The output data from the NLU component 960 (which may include tagged text, commands, etc.) may then be sent to a command processor 990. The destination command processor 990 may be determined based on the NLU output and/or a device arbitration decision made by the local device 102 and/or the remote system 352. In an illustrative example, if the NLU output includes a command to play music, the destination command processor 990 may be a music playing application, such as one located on a local device 102/202 or in a music playing appliance, configured to execute a music playing command, and the particular local device 102/202 chosen to perform the action may be based on the arbitration procedures, as described herein. If the NLU output includes a search request, the destination command processor 990 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 960 during runtime operations where NLU operations are performed on text (such as text output from an ASR component 950). An individual domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where an individual domain may include its own recognizer 963. An individual recognizer may include various NLU components such as an NER component 962, IC module 964 and other components such as an entity resolver, or other components.

For example, a music domain recognizer 963-A (Domain A) may have an NER component 962-A that identifies what slots (e.g., portions of input text) may correspond to particular words relevant to that domain. The words may correspond to entities such as (for the music domain) a performer, album name, song name, etc. An NER component 962 may use a machine learning model, such as a domain specific conditional random field (CRF) to both identify the portions corresponding to an entity as well as identify what type of entity corresponds to the text portion. For example, for the text "play songs by Joe Songbird," an NER 962-A trained for a music domain may recognize the portion of text [Joe Songbird] corresponds to an entity and an artist name. The music domain recognizer 963-A may also have its own intent classification (IC) component 964-A that can determine the intent of the text assuming that the text is within the proscribed domain. An IC component may use a model, such as a domain specific maximum entropy classifier to identify the intent of the text, where the intent is the action the user desires the system to perform. For this purpose, the remote system 352 may include a model training component. The model training component may be used to train the classifier(s)/machine learning models discussed above.

As noted above, multiple devices may be employed in a single speech processing system. In such a multi-device system, individual ones of the devices may include different components for performing different aspects of the speech processing. The multiple devices may include overlapping components. The components of the devices 102/202 and remote system 352, as illustrated in FIGS. 7-9, are exemplary, and may be located in a stand-alone device or may be included, in whole or in part, as a component of a larger device or system, may be distributed across a network or multiple devices connected by a network, etc.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
receiving, by a first device and from a second device collocated in an environment with the first device, first data associated with an utterance received at the second device;
determining, based at least in part on comparing the first data with second data associated with the utterance received at the first device, the second device is to perform an action with respect to the utterance;
processing at least a portion of audio data received from the second device, the audio data representing the utterance and the processing including using a speech processing component of the first device to determine a speech processing result; and
sending, by the first device, third data to the second device based at least in part on the speech processing result, the third data causing the second device to perform the action.

2. The method of claim 1, wherein the first data indicates a current state of the second device, and wherein the second data indicates a current state of the first device.

3. The method of claim 1, wherein the first data indicates a first amount of time since a first time at which the second device was last used, and wherein the second data indicates a second amount of time since a second time at which the first device was last used.

4. The method of claim 1, further comprising:
receiving, by the first device, the utterance at a first time; and
determining, by the first device, the first data is associated with the utterance based at least in part on the first data having been received within a threshold time period of the first time.

5. The method of claim 1, wherein:
the first data is received wirelessly from the second device; and
the third data is sent wirelessly to the second device.

6. The method of claim 1, wherein:
the first data is received wirelessly over a local area network from the second device; and
the third data is sent wirelessly over the local area network to the second device.

7. The method of claim 1, wherein the action comprises continuing to receive the utterance using a microphone of the second device.

8. The method of claim 1, wherein the action comprises sending fourth data wirelessly to a third device to control the third device.

9. The method of claim 8, wherein the third device is collocated in the environment with the first device and the second device.

10. The method of claim 1, wherein the audio data is first audio data, and wherein the speech processing result is a first speech processing result, the method further comprising:
processing at least a portion of second audio data generated by the first device, the second audio data representing the utterance and the processing of at least the portion of the second audio data including using the speech processing component to determine a second speech processing result; and
determining the speech processing component does not recognize an intent based at least in part on the second speech processing result,
wherein the sending of the third data to the second device based at least in part on the first speech processing result is based at least in part on the determining the speech processing component does not recognize the intent based at least in part on the second speech processing result.

11. A first device comprising:
one or more processors; and
memory storing computer-executable instructions that, when executed by the one or more processors, cause the first device to:
receive, from a second device collocated in an environment with the first device, first data associated with an utterance received at the second device;
determine, based at least in part on comparing the first data with second data associated with the utterance received at the first device, the second device is to perform an action with respect to the utterance;
process, using a speech processing component of the first device, at least a portion of audio data received from the second device to determine a speech processing result, the audio data representing the utterance; and
send third data to the second device based at least in part on the speech processing result, the third data causing the second device to perform the action.

12. The first device of claim 11, wherein the first data indicates a current state of the second device, and wherein the second data indicates a current state of the first device.

13. The first device of claim 11, wherein the first data indicates a first amount of time since a first time at which the second device was last used, and wherein the second data indicates a second amount of time since a second time at which the first device was last used.

14. The first device of claim 11, the computer-executable instructions, when executed by the one or more processors, further causing the first device to:
receive the utterance at a first time; and
determine the first data is associated with the utterance based at least in part on the first data having been received within a threshold time period of the first time.

15. The first device of claim 11, wherein:
the first data is received wirelessly from the second device; and
the third data is sent wirelessly to the second device.

16. The first device of claim 11, wherein:
the first data is received wirelessly over a local area network from the second device; and
the third data is sent wirelessly over the local area network to the second device.

17. The first device of claim 11, wherein the action comprises continuing to receive the utterance using a microphone of the second device.

18. The first device of claim 11, wherein the action comprises sending fourth data wirelessly to a third device to control the third device.

19. The first device of claim 18, wherein the third device is collocated in the environment with the first device and the second device.

20. The first device of claim 11, wherein the audio data is first audio data, and wherein the speech processing result is a first speech processing result, the computer-executable instructions, when executed by the one or more processors, further causing the first device to:
process, using the speech processing component, at least a portion of second audio data generated by the first device to determine a second speech processing result, the second audio data representing the utterance; and
determine the speech processing component does not recognize an intent based at least in part on the second speech processing result,
wherein sending the third data to the second device based at least in part on the first speech processing result is based at least in part on determining the speech processing component does not recognize the intent based at least in part on the second speech processing result.

* * * * *